United States Patent
Natsume

(10) Patent No.: US 9,732,834 B2
(45) Date of Patent: Aug. 15, 2017

(54) CONTROL APPARATUS FOR VEHICULAR DRIVE SYSTEM

(75) Inventor: Hiroshi Natsume, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 13/880,468

(22) PCT Filed: Oct. 22, 2010

(86) PCT No.: PCT/JP2010/068767
§ 371 (c)(1),
(2), (4) Date: Apr. 19, 2013

(87) PCT Pub. No.: WO2012/053116
PCT Pub. Date: Apr. 26, 2012

(65) Prior Publication Data
US 2013/0217539 A1    Aug. 22, 2013

(51) Int. Cl.
*B60W 30/18* (2012.01)
*F16H 39/00* (2006.01)
*B60K 6/48* (2007.10)
*B60K 6/547* (2007.10)
(Continued)

(52) U.S. Cl.
CPC ............. *F16H 39/00* (2013.01); *B60K 6/48* (2013.01); *B60K 6/547* (2013.01); *B60W 10/023* (2013.01);
(Continued)

(58) Field of Classification Search
USPC .......................................................... 701/51
See application file for complete search history.

(56) References Cited

U.S. PATENT DOCUMENTS 6,564,546 B2 * 5/2003 Brown ................... F16D 33/06
   137/312
7,117,963 B2 * 10/2006 Saito ....................... B60K 6/44
   180/65.1

(Continued)

FOREIGN PATENT DOCUMENTS

| CN | 101619697 A |   | 1/2010 |
|----|-------------|---|--------|
| JP | 2004-129411 A |   | 4/2004 |
| JP | 2010-101476 A | * | 5/2010 |

OTHER PUBLICATIONS

Machine Translation of Japanese Patent Pub. 2010-101476A from JPO dated Apr. 28, 2014.*

*Primary Examiner* — Jean-Paul Cass
(74) *Attorney, Agent, or Firm* — Andrews Kurth Kenyon LLP

(57) ABSTRACT

A control apparatus for a vehicular drive system provided with an automatic transmission constituting a part of a power transmitting path between an electric motor and drive wheels, and a fluid-operated power transmitting device provided between the electric motor and the automatic transmission and having an input rotary element connected to said electric motor, and an output rotary element connected to said automatic transmission, includes a warm-up control implementing portion configured to implement a stall control of said fluid-operated power transmitting device wherein the input rotary element of said fluid-operated power transmitting device is rotated by said electric motor while the fluid-operated power transmitting device is placed in a stalling state.

5 Claims, 9 Drawing Sheets

(51) Int. Cl.
   *B60W 10/02* (2006.01)
   *B60W 10/08* (2006.01)
   *B60W 10/115* (2012.01)
   *B60W 20/00* (2016.01)

(52) U.S. Cl.
   CPC .......... *B60W 10/08* (2013.01); *B60W 10/115* (2013.01); *B60W 20/00* (2013.01); *B60W 30/18054* (2013.01); *B60W 2710/1072* (2013.01); *B60Y 2300/30* (2013.01); *B60Y 2300/45* (2013.01); *Y02T 10/6221* (2013.01); *Y10T 477/631* (2015.01)

(56) References Cited

U.S. PATENT DOCUMENTS

| | | | | |
|---|---|---|---|---|
| 2001/0035010 A1* | 11/2001 | Brown | ................ | F16D 33/06 60/357 |
| 2004/0065490 A1 | 4/2004 | Saito et al. | | |
| 2004/0231901 A1* | 11/2004 | Shuniak | ................ | B60V 1/08 180/116 |
| 2008/0148723 A1* | 6/2008 | Birkestrand | .............. | E02B 9/00 60/327 |
| 2008/0202882 A1* | 8/2008 | Sturgin | ............... | F16D 25/0638 192/3.25 |
| 2008/0227597 A1* | 9/2008 | Povirk | ................ | F16H 45/02 477/62 |
| 2008/0271966 A1* | 11/2008 | Simpson | ................ | F16H 61/62 192/3.33 |
| 2009/0192685 A1* | 7/2009 | Sime | .................... | B60K 6/365 701/60 |
| 2009/0321157 A1 | 12/2009 | Sowul et al. | | |
| 2010/0036568 A1* | 2/2010 | Filla | ........................ | B60K 6/48 701/50 |
| 2010/0056330 A1* | 3/2010 | Schuh | ...................... | F01P 3/20 477/52 |
| 2013/0217539 A1* | 8/2013 | Natsume | ................ | B60K 6/48 477/52 |

* cited by examiner

FIG.3

|      | C1 | C2 | B1 | B2 | B3 | F1 |
|------|----|----|----|----|----|----|
| 1st  | ○  |    |    | ◎  |    | △  |
| 2nd  | ○  |    | ○  |    |    |    |
| 3rd  | ○  |    |    |    | ○  |    |
| 4th  | ○  | ○  |    |    |    |    |
| 5th  |    | ○  |    |    | ○  |    |
| 6th  |    | ○  | ○  |    |    |    |
| R    |    |    |    | ○  | ○  |    |
| N    |    |    |    |    |    |    |

◎ ENGAGED UPON ENGINE BRAKING

△ ENGAGED ONLY FOR VEHICLE DRIVING

CONTROL APPARATUS FOR VEHICULAR DRIVE SYSTEM

This is a 371 national phase application of PCT/JP2010/068767 filed 22

Oct. 2010, the contents of which are incorporated herein by reference.

TECHNICAL FIELD

The present invention relates to a control operation to warm-up a vehicular drive system in a cold state, which is provided with an electric motor and a fluid-operated power transmitting device.

BACKGROUND ART

There is well known a control apparatus for a vehicular drive system provided with a vehicle driving electric motor, and a fluid-operated power transmitting device interposed between the electric motor and drive wheels of a vehicle. Patent Document 1 discloses an example of such a control apparatus for a vehicular drive system. This control apparatus is configured to reduce an amount of supply of an electric energy to the above-indicated electric motor for a predetermined length of time, if the electric motor has been kept operated for more than a predetermined period of time in an operating state of the vehicular drive system wherein a rate of change of an operating speed of the electric motor is lower than a predetermined value while a drive force generated by the electric motor is larger than a predetermined value. This reduction of the electric energy supply amount makes it possible to prevent a rise of a temperature of the electric motor or a power control device including an inverter, which is connected to the electric motor.

PRIOR ART DOCUMENT

Patent Document

Patent Document 1: JP-2004-129411 A

SUMMARY OF THE INVENTION

Object Achieved By The Invention

In the vehicular drive system disclosed in the above-identified Patent Document 1, the electric motor is not usually supplied with an electric energy, and does not generate a drive force, while the vehicle is merely in a stationary state on a flat roadway surface. The vehicular drive system of the Patent Document 1 is also configured such that the engine is held at rest while the vehicle is merely in the stationary state on the flat roadway surface. In a cold state of the vehicle in the stationary state, therefore, the vehicular drive system does not substantially generate a heat, and is not warmed up enough. Although the engine may be operated in an idling state for its warm-up operation while the vehicle in the cold state is in the stationary state, this idling operation warms up only the engine, but does not warm up a transmission provided in the vehicular drive system. In the vehicular drive system provided with the transmission, therefore, rotary members of the transmission in a cold state have a large degree of friction due to a relatively high degree of viscosity of a cold working oil used for the transmission because of not being warmed up of the transmission, for example, giving rise to a risk of deterioration of the fuel economy of the vehicle. In this respect, it is noted that this problem is not publicly addressed.

The present invention was made in view of the background art described above. It is therefore an object of the present invention to provide a control apparatus for a vehicular drive system provided with an electric motor, a fluid-operated power transmitting device, and a transmission, which control apparatus makes it possible to promote an operation to warm up the transmission.

Means For Achieving The Object

The object indicated above is achieved according to the present invention, which provides (a) a control apparatus for a vehicular drive system provided with an automatic transmission constituting a part of a power transmitting path between an electric motor and drive wheels, and a fluid-operated power transmitting device having an input rotary element connected to the electric motor, and an output rotary element connected to the automatic transmission and disposed between the electric motor and the automatic transmission, (b) characterized by implementing a stall control of the above-described fluid-operated power transmitting device wherein the input rotary element of the above-described fluid-operated power transmitting device is rotated by the above-described electric motor while the fluid-operated power transmitting device is placed in a stalling state.

Advantages of the Invention

According to the present invention, the working oil within the fluid-operated power transmitting device is heated during the stall control of the above-described fluid-operated power transmitting device, and the heated working oil is supplied to the automatic transmission, so that the operation to warm-up the automatic transmission can be promoted. As a result, it is possible to reduce the deterioration of fuel economy of a vehicle. In this respect, it is noted that the "fuel economy" is interpreted to mean a running distance of the vehicle per unit amount of consumption of a fuel, and that an improvement of the fuel economy is an increase of the running distance of the vehicle per unit amount of consumption of the fuel, or a decrease of a fuel consumption ratio (=amount of consumption of the fuel/an output of the drive wheels) of the vehicle as a whole, while a reduction (deterioration) of the fuel economy is a decrease of the running distance of the vehicle per unit amount of consumption of the fuel, or an increase of the fuel consumption ratio of the vehicle as a whole. It is also noted that the fluid-operated power transmitting device placed in the stalling state means the fluid-operated power transmitting device held at rest, more specifically, not only the state of the fluid-operated power transmitting device in which the output rotary element is not rotated at all, but also the state in which the output rotary element is almost at rest.

According to a preferred form of the present invention, (a) the above-described vehicular drive system is provided with an engine, and an engine connecting/disconnecting clutch interposed between the engine and the above-described input rotary element and configured to selectively connect the engine and the input rotary element to each other, and (b) the above-described engine connecting/disconnecting clutch is placed in a released state during the above-described stall control of the fluid-operated power transmitting device. In this preferred form of the invention, the stall control of the fluid-operated power transmitting device can be implemented in the vehicle having the engine and the electric motor, while the engine is held at rest. Accordingly, the electric motor is not required to be operated to drive the engine during the stall control of the fluid-operated power transmitting device, whereby the required output of the electric motor can be reduced.

According to another preferred form of the invention, (a) the above-described vehicular drive system is provided with a heat exchanging device configured to be operable to carry out a heat exchange between a cooling water of the above-described engine and a working oil of the above-described fluid-operated power transmitting device, and (b) and the above-described engine is warmed up by transferring a heat of the above-described working oil to the above-described cooling water, with a heat exchanging operation of the above-described heat exchanging device during the above-described stall control of the fluid-operated power transmitting device. In this preferred form of the invention, the operation to warm up the engine as well as the operation to warm up the above-described automatic transmission can be promoted by the above-described stall control of the fluid-operated power transmitting device.

According to a further preferred form of the invention, (a) amounts of improvement of fuel economy of a vehicle to be respectively obtained in a heat-exchanging state and a non-heat-exchanging state of the above-described heat exchanging device during the above-described stall control of the fluid-operated power transmitting device are calculated, and (b) the above-described heat exchanging device is placed in the heat-exchanging state for performing the heat exchanging operation during the above-described stall control of the fluid-operated power transmitting device, when the above-described amount of improvement of the fuel economy of the vehicle to be obtained in the heat-exchanging state of the above-described heat exchanging device is larger than the above-described amount of improvement of the fuel economy of the vehicle in the non-heat-exchanging state of the above-described heat exchanging device. In this preferred form of the invention, the operation to warm up only the automatic transmission or the operation to warm up both of the automatic transmission and the engine is adequately selected from the standpoint of improving the fuel economy of the vehicle, so that the fuel economy improvement effect of the above-described stall control of the fluid-operated power transmitting device can be made larger than where both of the automatic transmission and the engine are always warmed up by the stall control of the fluid-operated power transmitting device.

According to a still further preferred form of the invention, in the stall control of the fluid-operated power transmitting device, an operating state of the above-described heat exchanging device is maintained until a temperature of the above-described working oil has reached a target value. In this preferred form of the invention, during the stall control of the fluid-operated power transmitting device it is possible to avoid frequent switching of the operating state of the heat exchanging device between the state in which the heat exchanging operation is performed, and the state in which the heat exchanging operation is not performed. It is noted that the operating state of the above-described heat exchanging device is either the heat-exchanging state or the non-heat-exchanging state. Namely, it is noted that maintaining the operating state means maintaining this heat-exchanging state if the heat exchanging device is once placed in its heat-exchanging state, and maintaining this non-heat-exchanging state if the heat exchanging device is once placed in its non-heat-exchanging state.

According to a yet further preferred form of the invention, the above-described stall control of the fluid-operated power transmitting device is implemented when a larger one of the amounts of improvement of the fuel economy of the above-described vehicle to be respectively obtained in the heat-exchanging state and the non-heat-exchanging state of the above-described heat exchanging device is equal to or larger than a predetermined fuel-economy improvement-amount lower limit. In this preferred form of the invention, the stall control of the fluid-operated power transmitting device is not implemented where the expected improvement effect of the fuel economy of the vehicle is not so large, so that the fuel economy of the vehicle can be effectively improved by the stall control of the fluid-operated power transmitting device.

According to another preferred form of the invention, the above-described stall control of the fluid-operated power transmitting device is a warming control operated by the electric motor for warming the automatic transmission which is implemented by operating the above-described electric motor to rotate the input rotary element of the above-described fluid-operated power transmitting device for thereby heating the working oil within the fluid-operated power transmitting device while the fluid-operated power transmitting device is placed in the stalling state.

According to still another preferred form of the invention, the above-described engine, the above-described fluid-operated power transmitting device and the above-described electric motor have respective axes parallel to drive axles which are connected to the above-described drive wheels to rotate the drive wheels.

According to yet another preferred form of the invention, the above-described working oil is used as a fluid which is supplied to the above-described fluid-operated power transmitting device, for transmitting a drive force between the above-described input rotary element and the above-described output rotary element in the fluid-operated power transmitting device, and as a lubricating oil to be supplied into the above-described automatic transmission. That is, the working oil serves as a working oil for the automatic transmission.

According to a further preferred form of the invention, the above-described stall control of the fluid-operated power transmitting device is implemented while the vehicle is in a stationary state.

According to a yet further preferred form of the invention, the above-described stall control of the fluid-operated power transmitting device is implemented by releasing the above-described engine connecting/disconnecting clutch in a halt state of the engine.

BRIEF DESCRIPTION OF THE DRAWINGS

FIG. 3 is a table for explaining operating states of coupling elements for establishing a plurality of speed positions (gear positions) of an automatic transmission provided in the vehicular drive system of FIG. 1;

MODE FOR CARRYING OUT THE INVENTION

Figure 1:
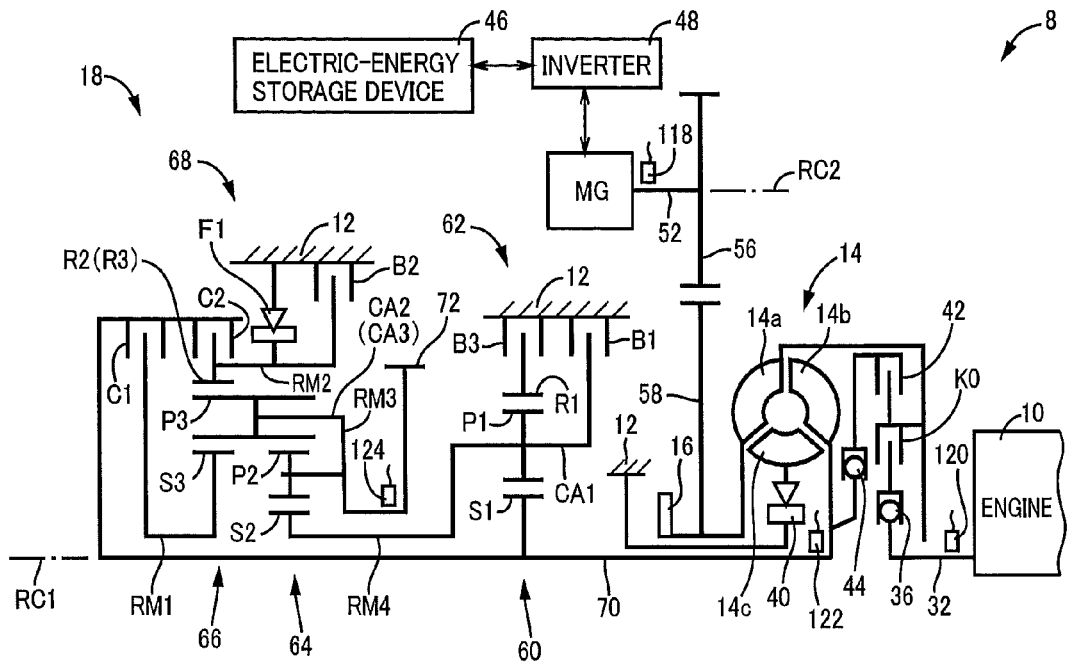
FIG. 1 is a schematic view of a vehicular drive system to which the present invention is suitably applicable.
Figure 2:
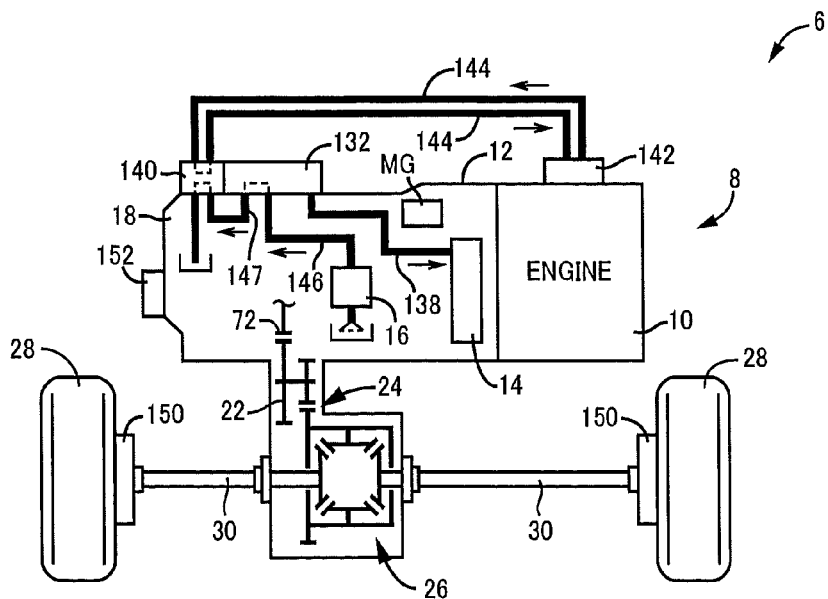
FIG. 2 is a view showing a power transmitting path from the vehicular drive system of FIG. 1 to drive wheels.

An embodiment of the present invention will be described in detail by reference to the drawings.
Embodiment FIG. 1 is the schematic view of a vehicular drive system 8 (hereinafter referred to as "drive system 8") to which the present invention is suitably applicable, and FIG. 2 is the view showing a power transmitting path from the drive system 8 to drive wheels 28. It is noted that an automatic transmission 18, a torque converter 14, etc. are substantially symmetric in construction with respect to their axes (first axis RC1), so that their lower halves are not shown in FIG. 1. The first axis RC1 shown in FIG. 1 represents the axes of an engine 10 and the torque converter 14, while a second axis RC2 represents the axis of an electric motor MG.

As shown in FIG. 1, the drive system 8 has the engine 10 of an water-cooled type such as a gasoline engine, a diesel engine or any other internal combustion engine, and a transaxle casing (T/A casing) 12 (hereinafter referred to as "casing 12") which is a stationary member fixed to a vehicle body by bolts or any other fixing means. Within the casing 12, there are disposed in series an engine connecting/disconnecting clutch K0, the torque converter 14, a hydraulic pump 16 and the automatic transmission 18, coaxially with each other on the first axis RC1, and in the order of description from the engine 10, while the electric motor MG is disposed so as to rotate around the second axis RC2 parallel to the first axis RC1. As shown in FIG. 2, the drive system 8 further has a counter driven gear 22 further meshing with output gear 72 performing as an output rotational member of the automatic transmission 18, a final gear pair 24, and a differential gear device (differential gear) 26 connected to the counter driven gear 22 through the final gear pair 24, which are disposed within the casing 12. The thus constructed drive system 8 is installed transversely on a front part of a front-drive vehicle 6, namely, the vehicle 6 of an FF (front-engine front-drive) type, for instance, and is suitably used to drive the drive wheels 28. In the drive system 8, a drive force of the engine 10 is transmitted from a crankshaft 32 of the engine 10, that is, from the engine output shaft 32, to the pair of drive wheels 28 through the engine connecting/disconnecting clutch K0 placed in its engaged state, the torque converter 14, the automatic transmission 18, the counter driven gear 22, the final gear pair 24, the differential gear device 26, a pair of drive axles 30, etc., in the order of description when the engine connecting/disconnecting clutch K0 is engaged.

The torque converter 14 is a fluid-operated power transmitting device which is interposed between the electric motor MG and the automatic transmission 18, and which rotates around the first axis RC1. The torque converter 14 is provided with a pump impeller 14a, a turbine impeller 14b and a stator impeller 14c. In this torque converter 14, a drive force received by the pump impeller 14a is transmitted to the turbine impeller 14b through a working fluid (working oil). This pump impeller 14a of the torque converter 14 is operatively connected to the electric motor MG, and is connected to the crankshaft 32 of the engine 10 through the engine connecting/disconnecting clutch K0. Namely, the pump impeller 14a is an input rotary element which is rotatable about the first axis RC1 and which receives the drive force from the electric motor MG and selectively receives the drive force from the engine 10 through the engine connecting/disconnecting clutch K0 which is selectively placed in its engaged and released states. The turbine impeller 14b is an output rotary element of the torque converter 14 which is connected to an input shaft of the automatic transmission 18, that is, to a transmission input shaft 70, such that the output rotary element is rotated with the turbine impeller 14b, through spline engagement with each other, for example. The stator impeller 14c can be fixed to the stationary member through a one-way clutch 40. Further, an input damper 36 is interposed between the engine connecting/disconnecting clutch K0 and the crankshaft 32 of the engine 10, so that the input damper 36 transmits a torque between the engine 10 and the pump impeller 14a through the engine connecting/disconnecting clutch K0 placed in the engaged state, while absorbing a pulsation of the torque.

The torque converter 14 is further provided with a lock-up clutch 42 and a lock-up clutch damper 44. This lock-up clutch 42 is a direct clutch which is interposed between the pump impeller 14a and the turbine impeller 14b, to selectively connected these pump and turbine impellers 14a, 14b to each other, and which is controlled hydraulically, for instance, so as to be placed in one of an engaged state (lock-up on state), a slipping state (lock-up slipping state) and a released state (lock-up off state). In the engaged state, more accurately, in the fully engaged state of the lock-up clutch 42, the above-described pump impeller 14a and turbine impeller 14b are rotated together about the first axis RC1. The lock-up clutch damper 44 has a function similar to that of the above-described input damper 36, and is interposed between the lock-up clutch 42 and the turbine impeller 14b.

The engine connecting/disconnecting clutch K0 functions as a power connecting/disconnecting device which is interposed between the engine 10 and the pump impeller 14a of the torque converter 14, to selectively connect the engine 10 and the pump impeller 14a to each other. For example, the engine connecting/disconnecting clutch K0 is a hydraulically operated frictional coupling device of a wet multiple-disc type in which a plurality of friction plates are forced against each other by a hydraulic actuator. The hydraulic actuator is operated by a hydraulic pressure generated by the hydraulic pump 16 and controlled by a hydraulic control circuit 132 of the drive device 8, to selectively engage and release the engine connecting/disconnecting clutch K0. A capacity of the torque that can be transmitted through the engine connecting/disconnecting clutch K0 in its engaged state, that is, an engaging force of the engine connecting/disconnecting clutch K0 is continuously variable by hydraulic pressure regulation by a linear solenoid valve provided within the above-indicated hydraulic control circuit 132, for instance. The engine connecting/disconnecting clutch K0 is provided with a pair of rotary clutch elements (clutch hub and a clutch drum) rotatable relative to each other and around the first axis RC1 when the clutch K0 is in a released state. In the released state of the engine connecting/disconnecting clutch K0, one of the rotary clutch elements (e.g., the clutch hub) is connected to the crankshaft 32 of the engine 10 such that the rotary clutch element in question and the crankshaft 32 are rotated together, while the other rotary clutch element (e.g., the clutch drum) is connected to the pump impeller 14a of the torque converter 14 such that this rotary clutch element and the pump impeller 14a are rotated together. The thus constructed engine connecting/disconnecting clutch K0 enables the pump impeller 14a to be rotated with the crankshaft 32 of the engine 10, when the clutch K0 is placed in the engaged state. Namely, the engine connecting/disconnecting clutch K0 permits the drive force of the engine 10 to be transmitted to the pump impeller 14a when the clutch K0 is placed in the engaged state, and disconnects the pump impeller 14a from the engine 10 when the clutch K0 is placed in the released state.

The electric motor MG has the second axis RC2 as a rotational center parallel to the first axis RC1, and is a so-called motor/generator having a function of an electric motor operable to generate a drive force, and a function of an electric generator operable to generate an electric energy for charging an electric-energy storage device 46. To an output shaft of this electric motor MG, that is, to an electric motor output shaft 52, an electric motor output gear 56 is connected such that the electric motor output gear 56 is rotated with the electric motor output shaft 52. This electric motor output gear 56 meshes with an electric motor connecting gear 58 connected to the pump impeller 14a of the torque converter 14 such that the electric motor connecting gear 58 is rotated with the pump impeller 14a. That is, the electric motor MG is connected not only to the above-described pump impeller 14a but also to the engine 10 through a pair of gears consisting of the electric motor output gear 56 and the electric motor connecting gear 58, and is also connected to the a transmission input shaft 70 through the torque converter 14.

The electric motor output gear 56 has a pitch circle having a diameter smaller than that of a pitch circle of the electric motor connecting gear 58. Namely, the number of teeth of the electric motor output gear 56 is smaller that that of the electric motor connecting gear 58, so that the operating speed of the electric motor MG is reduced before a rotary motion of the electric motor MG is transmitted to the pump impeller 14a. In other words, an output torque Tmg of the electric motor MG (hereinafter referred to as "electric motor torque Tmg") is boosted, and the boosted electric motor torque Tmg is transmitted to the pump impeller 14a.

The automatic transmission 18 is a transmission which constitutes a part of a power transmitting path between the electric motor MG and the drive wheels 28, and a part of a power transmitting path between the torque converter 14 and the drive wheels 28, and which is configured to receive the drive forces from the engine 10 and the electric motor MG. The automatic transmission 18 is provided with a plurality of hydraulically operated frictional coupling devices (clutches C and brakes B), more specifically, five hydraulically operated frictional coupling devices, which are selectively engaged and released in different combinations to establish respective speed positions (gear positions). Described in a simple way, the automatic transmission 18 is a step-variable transmission commonly used for vehicles and operable to perform so-called "clutch-to-clutch" shifting actions. As shown in FIG. 1, the automatic transmission 18 has a first transmitting portion 62 principally constituted by a first planetary gear set 60 of a single-pinion type, and a second transmitting portion 68 of a Ravigneaux type principally constituted by a double-pinion type second planetary gear set 64 and a single-pinion type third planetary gear set 66. The first and second transmitting portions 62, 68 are disposed coaxially with each other (on the first axis RC1), so that a rotary motion of the transmission input shaft 70 is transmitted to an output gear 72 such that the rotating speed of the output gear 72 is variable. This transmission input shaft 70 corresponds to an input member of the automatic transmission 18, and is a turbine shaft rotated by the turbine impeller 14b of the torque converter 14, in the present embodiment. On the other hand, the above-indicated output gear 72 corresponds to an output member of the automatic transmission 18, and meshes with the counter driven gear 22 (shown in FIG. 2), cooperating with the counter driven gear 22 to constitute a pair of gears. As shown in FIG. 2, a rotary motion of the output gear 72 is transmitted to the pair of drive wheels (front wheels) 28 through the counter driven gear 22, final gear pair 24, differential gear device 26 and pair of drive axles 30 in this order of description, so that a running speed V (km/h) of the vehicle increases with an increase of an output speed Nout (rpm) of the automatic transmission 18 which is the rotating speed of the output gear 72, that is, the vehicle running speed V is proportional to the output speed Nout.

The first planetary gear set 60 of the above-described first transmitting portion 62 is provided with a first sun gear S1, a first pinion gear P1, a first carrier CA1 supporting the first pinion gear P1 such that the first pinion gear P1 is rotatable about its axis and about the axis of the first planetary gear set 60, and a first ring gear R1 meshing with the first sun gear S1 through the first pinion gear P1. The first sun gear S1, first carrier CA1 and first ring gear R1 are three rotary elements of the first planetary gear set 60. In this first planetary gear set 60, the first sun gear S1 is connected to and rotated by the transmission input shaft 70, and the first ring gear R1 can be fixed to the casing 12 through the third brake B3 in non-rotatable manner, so that the rotating speed of an intermediate output member in the form of the first carrier CA1 is decelerated with respect to that of the transmission input shaft 70.

The second planetary gear set 64 of the above-described second transmitting portion 68 is provided with a second sun gear S2, a pair of pinion gears in the form of a second pinion gear P2 and a third pinion gear P3 meshing with each other, a second carrier CA2 supporting the second and third pinion gears P2, P3 such that each of the second and third pinion gears P2, P3 is rotatable about its axis and about the axis of the second planetary gear set 64, and a second ring gear R2 meshing with the second sun gear S2 through the second and third pinion gears P2, P3. The third planetary gear set 66 of the second transmitting portion 68 is provided with a third sun gear S3, a third pinion gear P3, a third carrier CA3 supporting the third pinion gear P3 such that the third pinion gear P3 is rotatable about its axis and about the axis of the third planetary gear set 66, and a third ring gear R3 meshing with the third sun gear S3 through the third pinion gear P3. The second planetary gear set 64 and the third planetary gear set 66 are partially fixed to each other, so as to have four rotary elements RM1-RM4. Described more specifically, the third sun gear S3 of the third planetary gear set 66 functions as the first rotary element RM1, and the second ring gear R2 of the second planetary gear set 64 and the third ring gear R3 of the third planetary gear set 66 are fixed to each other to function as the second rotary element RM2, while the second carrier CA2 of the second planetary gear set 64 and the third carrier CA3 of the third planetary gear set 66 are fixed to each other to function as the third rotary element RM3. Further, the second sun gear S2 of the second planetary gear set 64 functions as the fourth rotary element RM4. The second and third planetary gear sets 64, 66 have a planetary gear train of the Ravigneaux type wherein the second and third carriers CA2, CA3 are provided by a common one-piece member, and the second and third ring gears R2, R3 are provided by a common one-piece member, while the third pinion gear P3 of the third planetary gear set 66 also functions as one of the pair of pinion gears of the second planetary gear set 64.

The above-indicated first rotary element RM1 (third sun gear S3) is selectively connected to the transmission input shaft 70 through the first clutch C1, and the second rotary element RM2 (ring gears R2, R3) is selectively connected to the transmission input shaft 70 through the second clutch C2, and is selectively fixed to the casing 12 through the second brake B2 and thereby prevented from being rotated. The fourth rotary element RM4 (second sun gear S2) is integrally fixed to the first carrier CA1 of the first planetary gear set 60, and is selectively fixed to the casing 12 through the first brake B1 and thereby prevented from being rotated. The third rotary element RM3 (carriers CA2, CA3) is integrally fixed to the output gear 72, so that a rotary motion of the third rotary element RM3 is transmitted from the output gear 72. Between the second rotary element RM2 and the casing 12, there is interposed a coupling element in the form of a one-way clutch F1 which permits a rotary motion of the second rotary element RM2 in one of opposite directions (in the direction of rotation of the transmission input shaft 70) but inhibits a rotary motion of the same in the other direction. This one-way clutch F1 is disposed parallel to the second brake B2.

The above-described clutches C1, C2 and brakes B1, B2 and B3 (hereinafter collectively referred to as "clutches C" and "brakes B" unless otherwise specified) are hydraulically operated frictional coupling devices (hydraulically operated frictional coupling elements) of a wet multiple-disc type which are controlled by hydraulic actuators for engaging/releasing and each of which is operated by the hydraulic pressure generated by the hydraulic pump 16 and controlled by the hydraulic control circuit 132 of the drive system 8, so as to be selectively engaged and released. A capacity of the torque that can be transmitted through each of the clutches C and brakes B in its engaged state, that is, an engaging force of the clutch C or brake B is continuously variable by hydraulic pressure regulation by a linear solenoid valve provided within the hydraulic control circuit 132, for instance. The clutches C and brakes B are selectively engaged and released to establish one of six forward-drive gear (speed) positions and one reverse-drive gear (speed) position, as indicated in FIG. 3, depending upon a vehicle operator's operation of an accelerator pedal and the vehicle running speed V, for example. In FIG. 3, "1st" through "6th" respectively represent the first through sixth forward-drive speed positions, while "R" represents the reverse-drive position. A speed ratio γ of the automatic transmission 18 (=input speed Nin/output speed Nout) corresponding to each of the forward-drive and reverse-drive positions is suitably determined by gear ratios ρ1, ρ2 and ρ3 (=number of teeth of the sun gear/number of teeth of the ring gear) of the first planetary gear set 60, second planetary gear set 64 and third planetary gear set 66. The table of FIG. 3 represents the relationship between the above-indicated gear positions and the corresponding combinations of the operating states of the clutches C1, C2 and brakes B1-B3. In this table, a single circle represents the engaged state, and a double circle represents the engaged state to be established only when an engine brake is applied to the vehicle, while blanks indicate the released state. The above-indicated input speed Nin is the rotating speed of the transmission input shaft 70, and the above-indicated output speed Nout is the rotating speed of the output gear 72.

FIG. 3 is the table for explaining the operating states of the coupling elements for establishing the plurality of speed positions (gear positions) of the automatic transmission 18. The automatic transmission 18 is configured to establish one of the six forward-drive speed positions (forward-drive gear positions) consisting of the first speed position "1st" through sixth speed position "6th", and the reverse-drive position "R", depending upon a selected one of different combinations of connection of the rotary elements (sun gears S1-S3, carriers CA1-CA3 and ring gears R1-R3) of the first transmitting portion 62 and the second transmitting portion 68. Regarding the forward-drive gear positions, for example as shown in FIG. 3, (1) the first speed position is established by the engaging actions of the first clutch C1 and the second brake B2, (2) the second speed position whose speed ratio γ is lower than that of the first speed position is established by the engaging actions of the first clutch C1 and the first brake B1, (3) the third speed position whose speed ratio γ is lower than that of the second speed position is established by the engaging actions of the first clutch C1 and the third brake B3, (4) the fourth speed position whose speed ratio γ is lower than that of the third speed position is established by the engaging actions of the first clutch C1 and the second clutch C2, (5) the fifth speed position whose speed ratio γ is lower than that of the fourth speed position is established by the engaging actions of the second clutch C2 and the third brake B3, and (6) the sixth speed position whose speed ratio γ is lower than that of the fifth speed position is established by the engaging actions of the second clutch C2 and the first brake B1. Further, the reverse-drive position is basically established by the engaging actions of the second brake B2 and the third brake B3, and a neutral position "N" is established by the releasing actions of all of the clutches C1, C2 and brakes B1-B3. When a shift position $P_{SH}$ of the drive system 8 is an N position or a P position, for instance, the automatic transmission 18 is placed in the neutral position with the releasing actions of all of the clutches C1, C2 and brakes B1-B3. The automatic transmission 18 in the present embodiment is configured to establish each of the gear positions by engaging the selected two hydraulically operated frictional coupling devices, and to be shifted from this gear position to the neutral position by releasing one of the those two frictional coupling devices, so that the power transmitting path through the automatic transmission 18 is placed in a power cut-off state.

The brake B2 which is engaged to establish the first speed position "1st" is provided with the one-way clutch F1 disposed in parallel connection therewith is not necessarily engaged upon starting (accelerating) the vehicle. Further, one or the other of the first clutch C1 and the second clutch C2 is necessarily engaged to establish each of the forward-drive gear positions as shown in FIG. 3. Namely, the engaging action of the first clutch C1 or the second clutch C2 is required to establish each of the forward-drive gear positions. Accordingly, the first clutch C1 or the second clutch C2 functions as a forward-drive clutch, in the present embodiment.

The hydraulic pump 16 shown in FIG. 1 is a mechanically operated oil pump which generates the hydraulic pressure used to hydraulically operate the clutches and brakes, that is, the hydraulic pressure within the hydraulic control circuit 132, and feeds the working oil (lubricating oil) to various lubricating points such as ball bearings and gears within the automatic transmission 18, namely, to various lubricating points within the casing 12. An oil passage 138 (shown in FIG. 2) is formed within the casing 12, so that the above-indicated working oil fed from the hydraulic pump 16 to the hydraulic control circuit 132 is supplied to the torque converter 14 via the hydraulic control circuit 132. The pressure of the working oil generated from the hydraulic pump 16 is regulated by the hydraulic control circuit 132, before the working oil is supplied to the torque converter 14. The hydraulic pump 16 which is connected to the pump impeller 14a of the torque converter 14 is operated by the electric motor MG when the engine connecting/disconnecting clutch K0 is placed in the released state, and by one or both of the engine 10 and the electric motor MG when the engine connecting/disconnecting clutch K0 is placed in the engaged state.

As shown in FIG. 2, the drive system 8 is further provided with a heat exchanging device in the form of an ATF warmer 140, which is configured to be operable to carry out a heat exchange between the cooling water of the engine 10 (hereinafter referred to as "engine cooling water") and the working oil of the automatic transmission 18. The ATF warmer 140 is supplied with the engine cooling water through a cooling water pipe 144 connected to an electrically operated water pump 142 provided to circulate the engine cooling water through a radiator, and also supplied with the working oil of the automatic transmission 18 through working oil pipes 146, 147 connected to the hydraulic pump 16. Both of the engine cooling water and the working oil flow through the ATF warmer 140 so that the heat exchange takes place between the engine cooling water and the working oil. Namely, the ATF warmer 140 is placed in a heat-exchanging state for carrying out the heat exchange between the above-indicated engine cooling water and working oil, when both of the electrically operated water pump 142 and the hydraulic pump 16 are operated, and in a non-heat-exchanging state for inhibiting the above-indicated heat exchange, when at least one of the electrically operated water pump 142 and the hydraulic pump 16 is not operated. In an electric-motor-operated warm-up control described below, for instance, the hydraulic pump 16 connected to the electric motor MG is operated, so that the ATF warmer 140 is placed in the above-indicated heat-exchanging state if the electrically operated water pump 142 is operated, but is placed in the above-indicated non-heat-exchanging state if the electrically operated water pump 142 is not operated.

The drive system 8 is further provided with wheel braking devices 150 and a parking lock device 152. The wheel braking devices 150 are drum brakes or disc brakes provided for the respective drive wheels 28. When a parking brake lever is operated to a predetermined position by the vehicle operator to park the vehicle, for example, the drive wheels 28 are braked by the wheel braking devices 150. The parking lock device 152 is a locking mechanism for mechanically locking the output rotary member of the automatic transmission 18 in the form of the output gear 72, when a shift lever is operated by the vehicle operator to a P position (parking position) provided as one of shift positions $P_{SH}$ of the drive system 8, for example.

The drive system 8 constructed as described above is placed in an engine drive mode for running the vehicle with the engine 10 used as the drive power source, when the engine connecting/disconnecting clutch K0 is placed in the engaged state to transmit the drive force of the engine 10 to the pump impeller 14a. In the above-indicated engine drive mode, an assisting torque is generated, as needed, by the electric motor MG which is connected to the pump impeller 14a through the electric motor output gear 56 and electric motor connecting gear 58. On the other hand, the drive system 8 is placed in an EV drive mode (motor drive mode) for running the vehicle with the electric motor MG used as the drive power source and with the engine 10 held at rest, when the engine connecting/disconnecting clutch K0 is placed in the released state in which the power transmitting path between the engine 10 and the torque converter 14 is cut off. In the EV drive mode, the electric motor MG is operated to generate the vehicle drive force.

While the running vehicle 6 is temporarily placed in a stationary state, the engine 10 is held at rest with the engine connecting/disconnecting clutch K0 being placed in the released state, and the electric motor MG is operated to operate the hydraulic pump 16 and to generate a creep torque. This creep torque is based on a drive force generated by the electric motor MG and transmitted to the drive wheels 28 through the torque converter 14, so that the generation of the creep torque can be easily controlled so as to prevent the vehicle passengers from feeling uneasy with the creep torque.

During braking of the vehicle 6, the electric motor MG performs a regenerative operation to generate an electric energy for charging the electric-energy storage device 46 (shown in FIG. 1) through a inverter 48 (shown in FIG. 1).

The engine 10 is started by rotating the engine 10 using the electric motor torque Tmg with the engine connecting/disconnecting clutch K0 placed in the engaged state, for example. During running of the vehicle in the EV drive mode, the engine 10 is started also by the electric motor torque Tmg. In this case, the electric motor MG outputs a sum of the output torque required for running the vehicle and the output torque required for starting the engine 10.

Figure 4:
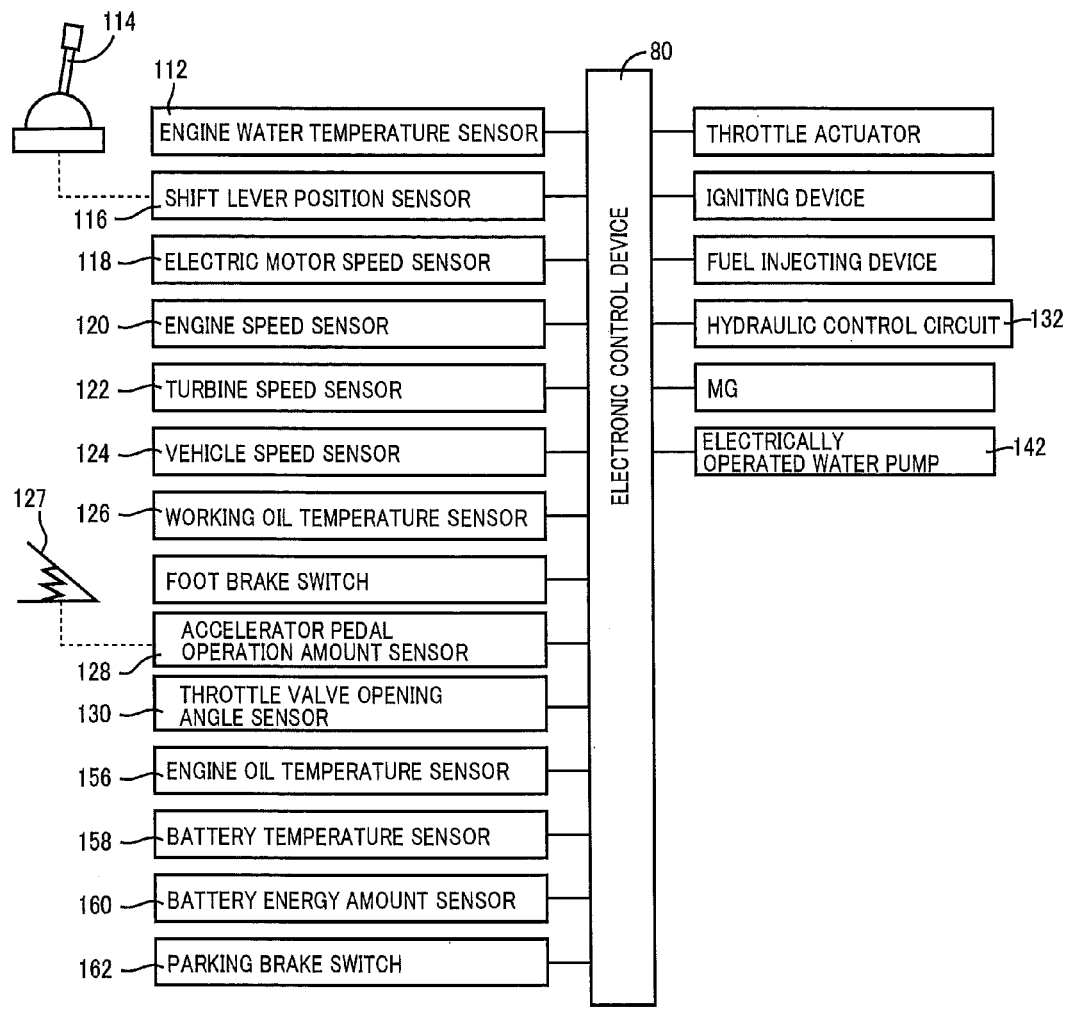
FIG. 4 is a view for explaining input and output signals of an electronic control device provided to control the vehicular drive system of FIG. 1.

FIG. 4 is the view for explaining input and output signals of a control apparatus in the form of an electronic control device 80 functioning to control the drive system 8. This electronic control device 80 includes a microcomputer which incorporates a CPU, a ROM, a RAM and an input-output interface and which operates to perform signal processing operations for hybrid drive controls of the engine 10 and the electric motor MG, for instance, according to control programs stored in the ROM while utilizing a temporary data storage function of the RAM. This electronic control device 80 also functions as a vehicular engine starting control device for starting the engine 10.

The electronic control device 80 receives input signals from various sensors and switches as shown in FIG. 4. The input signals include: an output signal of an engine water temperature sensor 112 indicative of an engine water temperature thw, which is the temperature of the engine cooling water for cooling the engine 10; an output signal of a shift lever position sensor 116 indicative of an operating position of a shift lever 114 which is operated by the vehicle operator to select the shift position $P_{SH}$ of the drive system 8; an output signal of an electric motor speed sensor 118 indicative of an operating speed Nmg of the electric motor MG (hereinafter referred to as "electric motor speed Nmg"); an output signal of an engine speed sensor 120 indicative of an engine speed Ne, which is the operating speed of the engine 10; an output signal of a turbine speed sensor 122 indicative of a turbine speed Nt, which is the rotating speed of the turbine impeller 14b of the torque converter 14; an output signal of a vehicle speed sensor 124 indicative of a rotating speed Nout of the output gear 72, which corresponds to the vehicle running speed V; an output signal of a working oil temperature sensor 126 indicative of a working oil temperature tho of the automatic transmission 18; a signal indicating an operation of a foot brake; an output signal of an accelerator pedal operation amount sensor 128 indicative of an operation amount Acc of an accelerator pedal, which represents a vehicle output required by the vehicle operator; an output signal of a throttle valve opening angle sensor 130 indicative of an opening angle $\theta_{TH}$ of an electric throttle valve (hereinafter referred to as a throttle valve opening angle $\theta_{TH}$'); an output signal of an engine oil temperature sensor 156 indicative of an engine oil temperature, which is the temperature of an engine oil used to lubricate the engine 10; an output signal of a battery temperature sensor 158 indicative of a temperature thbat of the electric-energy storage device 46 (shown in FIG. 1) (hereinafter referred to as "battery temperature thbat"); an output signal of a battery energy amount sensor 160 indicative of an electric energy amount SOC stored in (a charging state of) the electric-energy storage device 46; and an output signal of a parking brake switch 162 indicating whether a parking brake lever is in an operated state or not. It is noted that the electric motor speed sensor 118 can be said to function also as a pump speed sensor, since a pump speed Np which is the rotating speed of the pump impeller 14a of the torque converter 14 can be calculated on the basis of the electric motor speed Nmg, and according to a gear ratio of the electric motor output gear 56 and the electric motor connecting gear 58.

The electronic control device 80 generates engine control signals to be applied to an engine output control device for controlling the engine output, such as: a drive signal to be applied to a throttle actuator for operating the electric throttle valve provided in an intake pipe of the engine 10, to change the throttle valve opening angle $\theta_{TH}$; a fuel supply amount signal for controlling an amount of supply of a fuel from a fuel injecting device of the engine 10 into the intake pipe; an ignition signal to be applied to an igniting device of the engine 10 for controlling the ignition timing; and a command signal for operating the electric motor MG. The electronic control device 80 also generates valve command signals for operating solenoid-operated valves incorporated in the hydraulic control circuit 132, for controlling the hydraulic actuators for the clutches C and brakes B of the automatic transmission 18. In the engine drive mode, for example, the electronic control device 80 commands the above-indicated throttle actuator to be operated on the basis of the accelerator pedal operation amount Acc such that the throttle valve opening angle $\theta_{TH}$ increases with an increase of the accelerator pedal operation amount Acc. In this throttle valve control, the throttle valve opening angle $\theta_{TH}$ is proportional to the accelerator pedal operation amount Acc.

In a stationary state of an ordinary engine-driven vehicle, the engine 10 is operated in an idling state. In a stationary state of a hybrid vehicle like the vehicle 6 according to the present embodiment, however, the engine 10 is normally held at rest without an idling operation. Accordingly, a warm-up operation of the engine 10 and automatic transmission 18 of the hybrid vehicle tends to be delayed, as compared with that of the engine-driven vehicle. In view of this drawback, the vehicle 6 according to the present embodiment is configured to implement an accelerated warm-up control to promote the warm-up operation while the vehicle 6 in a cold state is in a stationary state. Described more specifically, the accelerated warm-up control is an electric-motor-operated warm-up control in which the automatic transmission 18 is warmed up by heating the working oil within the torque converter 14 while the torque converter 14 is placed in a staffing state and by operating the electric motor MG to rotate the pump impeller 14a. This electric-motor-operated warm-up control corresponds to a stall control of a fluid-operated power transmitting device according to the present invention. In the electric-motor-operated warm-up control, the working oil temperature tho is raised with the working oil stirred within the torque converter 14, so that the automatic transmission 18 can be warmed up. Major control functions according to the present embodiment relating to the electric-motor-operated warm-up control will be described by reference to FIG. 5. It is noted that the torque converter 14 placed in a staffing state means the torque converter 14 held at rest, more specifically, not only the state of the torque converter 14 in which the turbine impeller 14b is not rotated at all, but also the state in which the turbine impeller 14b is almost at rest.

Figure 5:
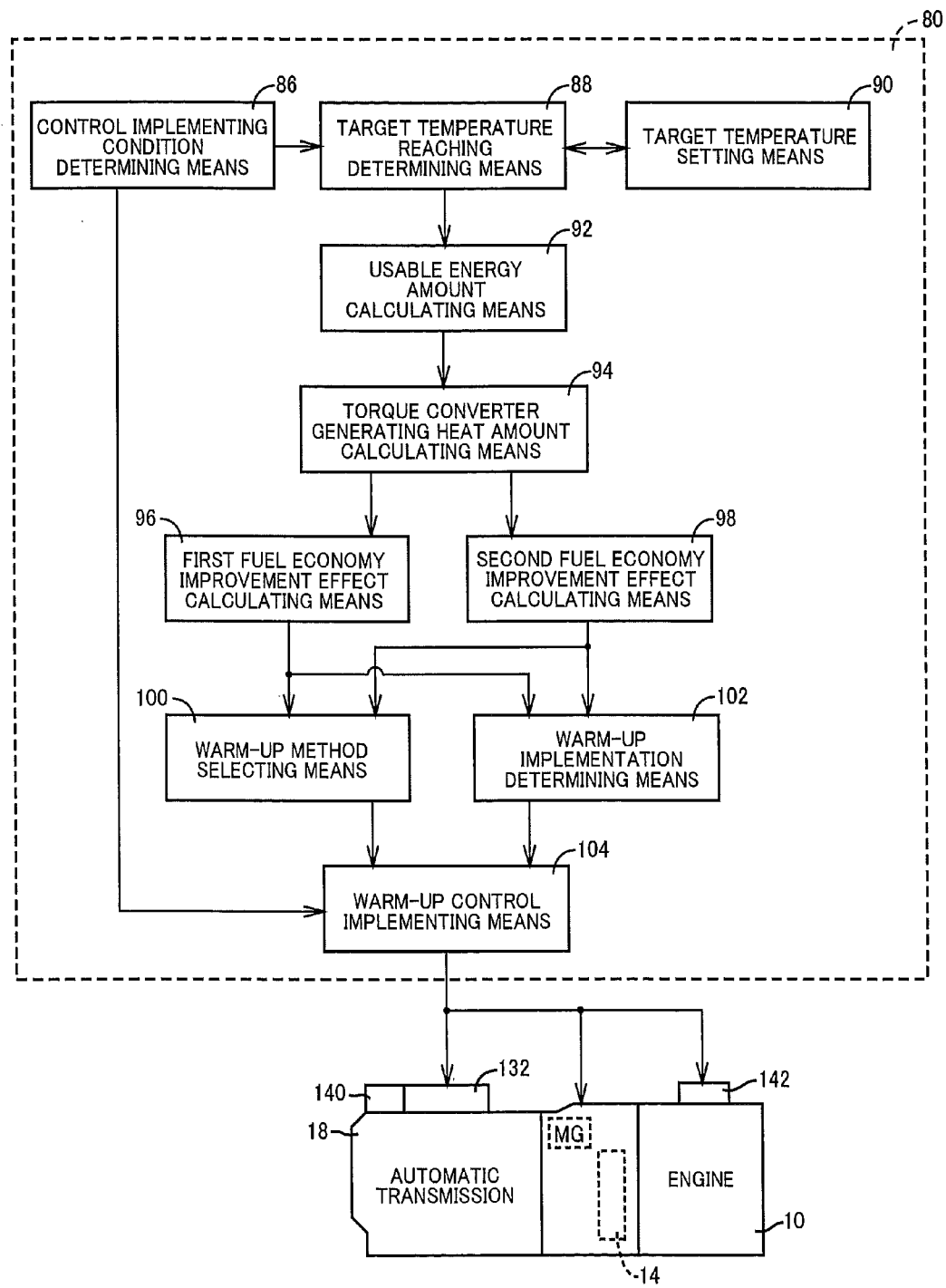
FIG. 5 is a functional block diagram for explaining major control functions of the electronic control device of FIG. 4.
Figure 6:
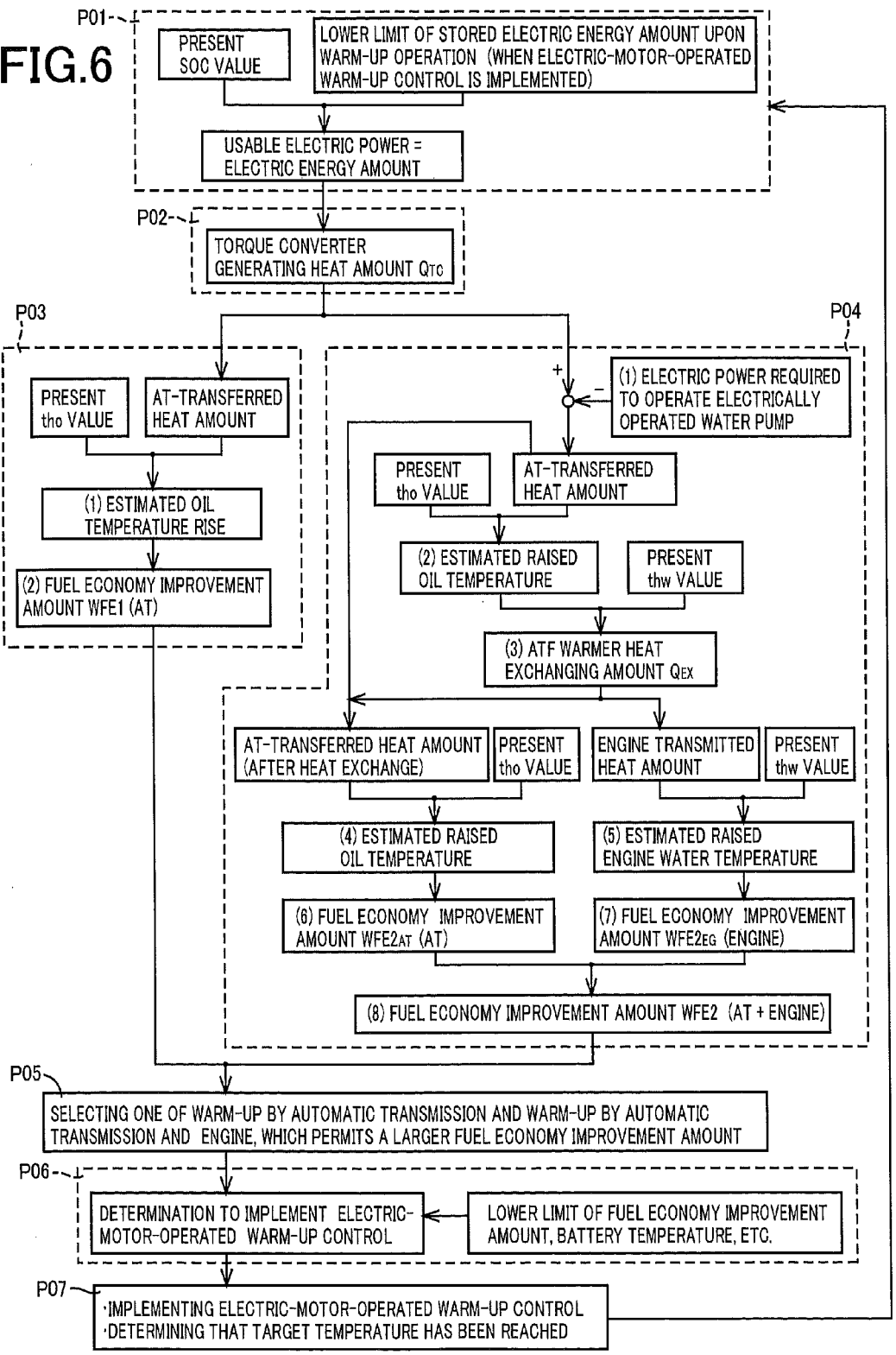
FIG. 6 is a block diagram illustrating a major portion of a control flow relating to an electric-motor-operated warm-up control implemented by the electronic control device of FIG. 4.

FIG. 5 is the functional block diagram for explaining the major control functions of the electronic control device 80, and FIG. 6 is the block diagram illustrating a major portion of a control flow relating to the above-indicated electric-motor-operated warm-up control (accelerated warm-up control). It is noted that "AT" in FIG. 6 denotes automatic transmission 18. As shown in FIG. 5, the electronic control device 80 includes a control implementing condition determining portion in the form of control implementing condition determining means 86, a target temperature reaching determining portion in the form of target temperature reaching determining means 88, a target temperature setting portion in the form of target temperature setting means 90, a usable energy amount calculating portion in the form of usable energy amount calculating means 92, a torque converter generating heat amount calculating portion in the form of torque converter generating heat amount calculating means 94, a first fuel economy improvement effect calculating portion in the form of first fuel economy improvement effect calculating means 96, a second fuel economy improvement effect calculating portion in the form of second fuel economy improvement calculating means 98, a warm-up method selecting portion in the form of warm-up method selecting means 100, a warm-up implementation determining portion in the form of warm-up implementation determining means 102, and a warm-up control implementing portion in the form of warm-up control implementing means 104.

The control implementing condition determining means 86 shown in FIG. 5 is configured to determine whether control implementing conditions required to implement the electric-motor-operated warm-up control have been satisfied or not. For example, the control implementing conditions have been satisfied if all of the following conditions are met: (i) the vehicle 6 is in a stationary state; (ii) the temperature tho of the working oil of the automatic transmission 18 is not higher than a predetermined cold-state threshold value tho1; (iii) the engine 10 is at rest; and (iv) the electric energy amount SOC stored in the electric-energy storage device 46 is not smaller than a predetermined warm-up lower limit $SOC1_{LOW}$. For example, the control implementing condition determining means 86 determines that the above-described condition (i) is met based on that the vehicle 6 is in a stationary state, if the vehicle running speed V is zero. The above-described condition (ii) is a condition for determining whether the automatic transmission 18 is so cold that it is necessary to warm up the automatic transmission 18. The cold-state threshold value tho1 is predetermined by experimentation so that the automatic transmission 18 is warmed up when the temperature tho is not higher than the predetermined cold-state threshold value tho1. The determination for the above-described condition (iii) as to whether the engine 10 is at rest can be made on the basis of the operating sate of the fuel injecting device or igniting device of the engine 10 for example. The above-described condition (iv) is a condition for determining whether the electric motor MG can be operated to implement the electric-motor-operated warm-up control. The warm-up lower limit $SOC1_{LOW}$ is predetermined by experimentation so that the consumption of the electric energy by the electric motor MG to implement the electric-motor-operated warm-up control does not cause a trouble such as deterioration of durability of the electric-energy storage device 46.

The target temperature reaching determining means 88 is configured to detect from time to time the temperature tho of the working oil according to the output signal of the working oil temperature sensor 126, and to determine from time to time whether the working oil temperature tho has reached a target value th\*, if the control implementing condition determining means 86 has determined that the control implementing conditions have been satisfied. An affirmative determination that the working oil temperature tho has reached the target value th\* is obtained if the working oil temperature tho has been raised up to the target value th\* or higher. This target value th\* is an intermediate target value to which the working oil temperature tho has reached during its rise by the above-described electric-motor-operated warm-up control and which is a temperature value at which a determination is made as to whether the operating state of the ATF warmer 140 should be changed in the process of raising the working oil temperature tho, namely, a heat-exchanging-state changing temperature value. An initial value of the target value th\* is determined to be low enough to necessarily obtain the affirmative determination that the working oil temperature tho has reached the target value th\* (for instance, determined to be −100° C.). Therefore, the target temperature reaching determining means 88 obtains the affirmative determination that the working oil temperature tho has reached the target value th\*, when the control implementing conditions which have not been satisfied are satisfied.

The target temperature reaching determining means 88 which has once obtained the affirmative determination that the working oil temperature tho has reached the target value th\* obtains a negative determination that the working oil temperature tho has not reached the target value th\*, if the target value th\* is updated by the target temperature setting means 90, to a value higher than the present value tho, as described below.

The target temperature setting means 90 is configured to set the target value th\* when the target temperature reaching determining means 88 has determined that the working oil temperature tho has reached the target value th\*. Described more specifically, the target temperature setting means 90 updates the target value th\* in steps to a higher value each time it is determined that the working oil temperature tho has reached the target value th\*. This setting or updating of the target value th\* is completed before the next determination by the target temperature reaching determining means 88 is made. The incremental amount by which the target value th\* is increased upon each updating operation may vary from time to time or may be held constant, and is predetermined by experimentation so as to prevent a frequent change of the operating state of the above-described ATF warmer 140 between a heat-exchanging state and a non-heat-exchanging state in the electric-motor-operated warm-up control. The target value th\* is preferably updated to each critical temperature value at and above which the fuel economy is greatly influenced. For instance, the target value th\* is updated from the initial value to a lock-up initiating temperature value at and above which an engaging action of the lock-up clutch 42 is permitted. That is, the fuel economy is greatly influenced if the engaging action of the lock-up clutch 42 is permitted when the working oil temperature tho has been raised to the lock-up initiating temperature value.

An operation of the usable energy amount calculating means 92 corresponds to a step P01 shown in FIG. 6. Each time the target temperature reaching determining means 88 has determined that the working oil temperature tho has reached the target value th\*, the usable energy amount calculating means 92 calculates an electric power (the unit of which is kWh, for instance), namely, an electric energy amount usable for the above-described electric-motor-operated warm-up control, on the basis of a surplus stored electric energy amount ($=SOC-SOC1_{LOW}$), which is a difference between the electric energy amount SOC stored in the electric-energy storage device 46 and the warm-up lower limit $SOC1_{LOW}$. The above-indicated stored electric energy amount SOC used for the calculation may be a value at the time of the calculation or at a moment at which the working oil temperature tho has reached the target value th\*. A relationship between the above-indicated surplus stored electric energy amount and the above-indicated usable electric energy amount is predetermined by experimentation such that the usable electric energy amount increases with an increase of the surplus stored electric energy amount. The usable electric energy amount calculating means 92 calculates the usable electric energy amount according to the predetermined relationship between the surplus stored electric energy amount and the usable electric energy amount.

An operation of the torque converter generating heat amount calculating means 94 corresponds to a step P02 shown in FIG. 6. The torque converter generating heat amount calculating means 94 is configured to calculate a heat amount $Q_{TC}$ (the unit of which is kWh, for instance) estimated to be generated by the torque converter 14 during implementation of the above-described electric-motor-operated warm-up control, on the basis of the above-indicated usable electric energy amount, after the usable electric energy amount calculating means 92 has calculated the above-described usable electric energy amount. The calculated heat amount $Q_{TC}$ to be generated by the torque converter 14 is a quantity of heat to be generated for a predetermined time period $TIME_{WM}$, that is, a quantity of heat to be generated by the torque converter 14 during a length of time from the present point of time up to a point of time at which the predetermined time period $TIME_{WM}$ has passed. Namely, the torque converter generating heat amount calculating means 94 calculates the heat amount $Q_{TC}$ to be generated for the predetermined time period $TIME_{WM}$ during which the electric-motor-operated warm-up control is implemented by operating the electric motor MG to rotate the pump impeller 14a for stirring the working oil in the torque converter 14, without rotation of the turbine impeller 14b. A relationship between the heat amount $Q_{TC}$ to be generated by the torque converter 14 and the above-described usable electric energy amount is predetermined by experimentation such that the generated heat amount $Q_{TC}$ of the torque converter 14 increases with an increase of the usable electric energy amount. The torque converter generating heat amount calculating means 94 calculates the generated heat amount $Q_{TC}$ of the torque converter 14 according to the predetermined relationship between the generated heat amount $Q_{TC}$ of the torque converter 14 and the above-described usable electric energy amount. In this respect, it is noted that if the above-indicated predetermined time period $TIME_{WM}$ is excessively long, the amount of rise of the working oil temperature tho by the electric-motor-operated warm-up control is saturated so that it is not possible to accurately estimate an effect of improvement of the fuel economy (described below) by the electric-motor-operated warm-up control, and that if the predetermined time period $TIME_{WM}$ is excessively short, the above-indicated generated heat amount $Q_{TC}$ of the torque converter 14 is extremely small so that it is not possible to accurately estimate the above-indicated effect of improvement of the fuel economy by the electric-motor-operated warm-up control. In view of those facts, the time period $TIME_{WM}$ is predetermined by experimentation so that the above-indicated effect of improvement of the fuel economy can be accurately calculated or estimated.

Figure 7:
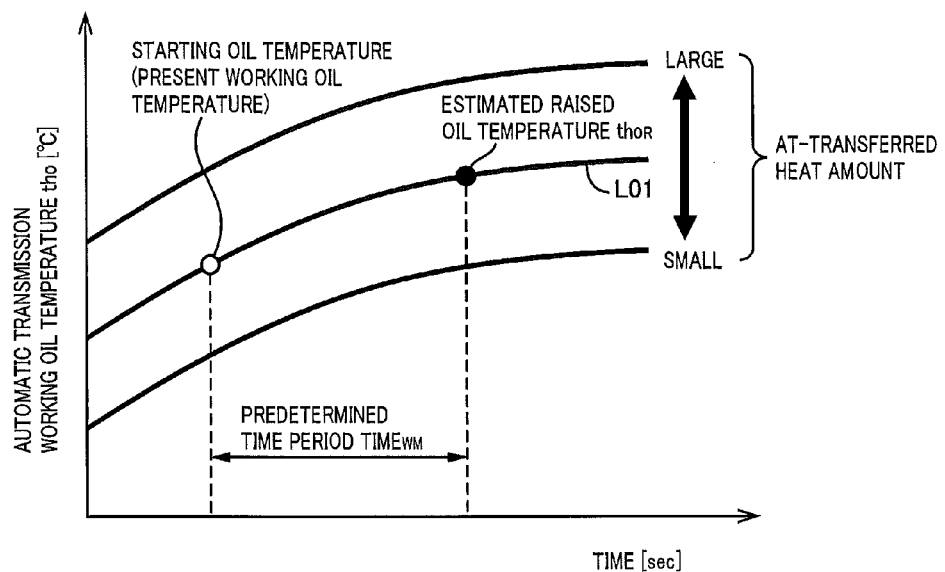
FIG. 7 is a working oil temperature map which is obtained by experimentation and used for the electric-motor-operated warm-up control implemented by the electronic control device of FIG. 4, and which represents a relationship between a temperature of a working oil and a time lapse, for each of different values of an heat amount transferred to the automatic transmission.
Figure 8:
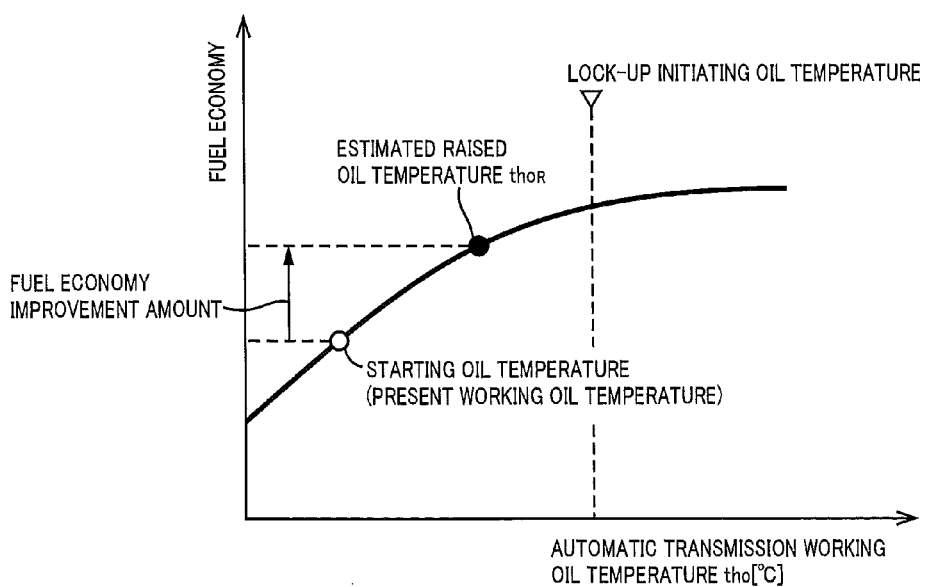
FIG. 8 is a working oil temperature/fuel economy map which is obtained by experimentation and used for the electric-motor-operated warm-up control implemented by the electronic control device of FIG. 4, and which represents a relationship between the temperature of the working oil and a fuel economy of the vehicle during running of the vehicle in a predetermined mode.

An operation of the first fuel economy improvement effect calculating means 96 corresponds to a step P03 shown in FIG. 6. After the torque converter generating heat amount calculating means 94 has calculated the generated heat amount $Q_{TC}$, the first fuel economy improvement effect calculating means 96 calculates an effect of improvement of the fuel economy by the above-described electric-motor-operated warm-up control to warm up only the automatic transmission 18 without a heat exchanging operation of the ATF warmer 140. Described more specifically, the first fuel economy improvement effect calculating means 96 initially calculates a heat amount $Q_{AT}$ of the automatic transmission 18 ($=Q_{TC} \times \eta_{AT}$: the unit of which is kWh, for example, and which is hereinafter referred to as "AT-transferred heat amount $Q_{AT}$") to be transferred from the torque converter 14 to the automatic transmission 18 for the above-indicated predetermined time period $TIME_{WM}$, by multiplying the above-indicated heat amount $Q_{TC}$ of the torque converter 14 by an experimentally predetermined AT heat transfer coefficient $\eta_{AT}$. Then, the first fuel economy improvement effect calculating means 96 calculates an estimated raised working oil temperature $tho_R$ that is the working oil temperature tho raised by the above-indicated AT-transferred heat amount $Q_{AT}$ for the above-indicated predetermined time period $TIME_{WM}$, on the basis of the AT-transferred heat amount $Q_{AT}$ and the starting temperature that is the present working oil temperature tho, and according to a predetermined relationship as indicated in FIG. 7, which is obtained by experimentation. FIG. 7 is the working oil temperature map which is obtained by experimentation and which represents the relationship between the working oil temperature tho and a time lapse, for each of different values of the AT-transferred heat amount $Q_{AT}$. In the example of FIG. 7, a curve indicated by a solid line L01 is selected as the relationship corresponding to a given value of the AT-transferred heat amount $Q_{AT}$, and the estimated raised working oil temperature $tho_R$ after elapsing of the above-indicated predetermined time period $TIME_{WM}$ is calculated on the basis of the present working oil temperature tho. Then, the first fuel economy improvement effect calculating means 96 calculates or estimates the effect of improvement of the fuel economy, that is, an fuel economy improvement amount WFE1 during the above-indicated predetermined time period $TIME_{WM}$, on the basis of the present working oil temperature tho and the above-indicated estimated raised working oil temperature $tho_R$, and according to a predetermined relationship (working oil temperature/fuel economy map) as indicated in FIG. 8, which is obtained by experimentation. The fuel economy improvement amount WFE1 during the above-indicated predetermined time period $TIME_{WM}$ is an amount of improvement of the fuel economy owing to a rise of the working oil temperature tho from the present value to the above-indicated estimated raised temperature value $tho_R$, and may be called a "fuel economy improvement effect WFE1". FIG. 8 is the working oil temperature/fuel economy map and which represents the relationship between the working oil temperature tho and the fuel economy of the vehicle 6 during running of the vehicle 6 in a predetermined mode. It will be understood from FIG. 8 that the fuel economy is improved as the working oil temperature tho is raised. The "fuel economy" taken along the vertical axis of the graph of FIG. 8, which may be defined in various ways, is defined as a running distance of the vehicle per unit amount of consumption of the fuel (the unit of which is km/L, for instance) in a present embodiment.

An operation of the second fuel economy improvement effect calculating means 98 corresponds to a step P04 shown in FIG. 6. After the torque converter generating heat amount calculating means 94 has calculated the above-indicated heat amount $Q_{TC}$ of the torque converter 14, the second fuel economy improvement effect calculating means 98 calculates an effect of improvement of the fuel economy by the above-described electric-motor-operated warm-up control to warm up both of the automatic transmission 18 and the engine 10 by a heat exchanging operation of the ATF warmer 140. More specifically, the second fuel economy improvement effect calculating means 98 calculates the effect of improvement of the fuel economy in the following manner.

Initially, the second fuel economy improvement effect calculating means 98 calculates an in engine warm-up generated heat amount $Q_{TC}'$ by subtracting the above-indicated electric power (the unit of which is kWh, for instance) required to operate the electrically operated water pump 142 for the above-indicated predetermined time period $TIME_{WM}$, from the above-indicated heat amount $Q_{TC}$ of the torque converter 14, since the electrically operated water pump 142 should be operated so that the ATF warmer 140 performs the heat exchanging operation. The electric power required to operate the electrically operated water pump 142 is subtracted from the heat amount $Q_{TC}$, to calculate the engine warm-up heat amount $Q_{TC}'$ because the electric energy amount SOC stored in the electric-energy storage device 46 is consumed by the electrically operated water pump 142. The electric power required to operate the electrically operated water pump 142 is predetermined by experimentation, for example.

Then, the second fuel economy improvement effect calculating means 98 calculates a heat exchanging amount $Q_{EX}$ (the unit of which is kWh, for instance) of the ATF warmer 140 for the above-indicated predetermined time period $TIME_{WM}$. Described more specifically, the second fuel economy improvement effect calculating means 98 an AT-transferred heat amount $Q_{AT}{'}$ $(=Q_{TC}{'}\times \eta_{AT})$ when the above-described ATF warmer 140 does not perform the heat exchanging operation, by multiplying the above-indicated engine warm-up heat amount $Q_{TC}{'}$ by the above-indicated AT heat transfer coefficient $\eta_{AT}$, in a manner similar to that in the calculation of the AT-transferred heat amount $Q_{AT}$ by the first fuel economy improvement effect calculating means 96. Then, the second fuel economy improvement effect calculating means 98 calculates the estimated raised working oil temperature $tho_R$ at the time of expiration of the above-indicated predetermined time period $TIME_{WM}$ (indicated at (2) in the step P04 shown in FIG. 6), on the basis of the calculated AT-transferred heat amount $Q_{AT}{'}$ and the present working oil temperature tho, and according to the working oil temperature map of FIG. 7. Then, the second fuel economy improvement effect calculating means 98 calculates the heat exchanging amount $Q_{EX}$ of the ATF warmer 140 in the predetermined time period $TIME_{WM}$ on the basis of the calculated raised working oil temperature $tho_R$ calculated on the basis of the above-indicated AT-transferred heat amount $Q_{AT}{'}$, and the present engine water temperature thw that is the starting engine water temperature, and according to a relationship (heat exchanging amount map) among the engine water temperature thw, the estimated raised working oil temperature $tho_R$ and the above-indicated heat exchanging amount $Q_{EX}$ of the ATF warmer 140, which relationship is predetermined by experimentation depending upon the above-indicated predetermined time period $TIME_{WM}$.

Then, the second fuel economy improvement effect calculating means 98 calculates the estimated raised working oil temperature $tho_R$ at the time of expiration of the above-indicated predetermined time period $TIME_{WM}$ (indicated at (4) in the step P04 shown in FIG. 6), on the basis of the present working oil temperature tho, and an AT-transferred heat amount $Q_{ATEX}$ $(=Q_{TC}{'}-Q_{EX})$ after the heat exchanging operation, which is obtained by subtracting the calculated heat exchanging amount $Q_{EX}$ of the ATF warmer 140 from the above-indicated engine warm-up heat amount $Q_{TC}{'}$, and according to the working oil temperature map of FIG. 7, in a manner similar to that in the calculation by the first fuel economy improvement effect calculating means 96. Then, the second fuel economy improvement effect calculating means 98 calculates or estimates an effect of improvement of the fuel economy owing to a rise of the working oil temperature, namely, a fuel economy improvement amount $WFE2_{AT}$ owing to the rise of the working oil temperature during the above-indicated predetermined time period $TIME_{WM}$, on the basis of the present working oil temperature tho and the above-indicated estimated raised working oil temperature $tho_R$, and according to the working oil temperature/fuel economy map of FIG. 8.

The second fuel economy improvement effect calculating means 98 calculates also an estimated raised engine water temperature $thw_R$ at the time of expiration of the above-described time period $TIME_{WM}$ (indicated at (5) in the step P04 shown in FIG. 6), in a manner similar to that in the calculation of the fuel economy improvement amount $WFE2_{AT}$ owing to the rise of the working oil temperature, on the basis of the present engine water temperature thw, and the calculated heat exchanging amount $Q_{EX}$ of the ATF warmer 140 which is an engine-transferred heat amount $Q_{EG}$ $(=Q_{EX})$ to be transferred to the engine 10 for the above-indicated predetermined time period $TIME_{WM}$, and according to a relationship (engine water temperature map) which is obtained by experimentation and which is similar to that of FIG. 7 but is different in that the engine water temperature thw rather than the working oil temperature tho is taken along the vertical axis. Then, the second fuel economy improvement effect calculating means 98 calculates or estimates an effect of improvement of the fuel economy owing to a rise of the engine water temperature, namely, a fuel economy improvement amount $WFE2_{EG}$ owing to the rise of the engine water temperature during the above-indicated predetermined time period $TIME_{WM}$ (indicated at (5) in the step P04 shown in FIG. 6), on the basis of the present engine water temperature thw and the above-indicated estimated raised engine water temperature $thw_R$, and according to and according to a relationship (engine water temperature/fuel economy map) which is obtained by experimentation and which is similar to that of FIG. 8 but is different in that the engine water temperature thw rather than the working oil temperature tho is taken along the horizontal axis.

The second fuel economy improvement effect calculating means 98 then sums the calculated fuel economy improvement amount $WFE2_{AT}$ owing to the rise of the working oil temperature and the calculated fuel economy improvement amount $WFE2_{EG}$ owing to the rise of the engine water temperature, to calculate or estimate a fuel economy improvement amount WFE2 obtained by warming up both the automatic transmission 18 and the engine 10 for the above-indicated predetermined time period $TIME_{WM}$. Like the above-described fuel economy improvement amount WFE1, this fuel economy improvement amount WFE2 for the above-indicated predetermined time period $TIME_{WM}$ may be called "fuel economy improvement rate WFE2". Thus, the effect of improvement of the fuel economy by warming up both the automatic transmission 18 and the engine 10 by the heat exchanging operation of the ATF warmer 140 in the electric-motor-operated warm-up control is calculated.

An operation of the warm-up method selecting means 100 corresponds to a step P05 shown in FIG. 6. After the first fuel economy improvement effect calculating means 96 and the second fuel economy improvement effect calculating means 98 have respectively calculated the above-indicated fuel economy improvement amounts WFE1 and WFE2, the warm-up method selecting means 100 compares these fuel economy improvement amounts WFE1 and WFE2 calculated by the first and second fuel economy improvement effect calculating means 96, 98. If the fuel economy improvement amount WFE1 calculated by the first fuel economy improvement effect calculating means 96 is equal to or larger than the fuel economy improvement amount WFE2 calculated by the second fuel economy improvement effect calculating means 98, it is estimated that the fuel economy of the vehicle 6 can be improved by a larger amount when only the automatic transmission 18 is warmed up, without the heat exchanging operation of the ATF warmer 140, in the above-described electric-motor-operated warm-up control. In this case, therefore, the warm-up method selecting means 100 selects the warm-up operation of only the automatic transmission 18, that is, selects the above-indicated non-heat-exchanging state of the ATF warmer 140. If the fuel economy improvement amount WFE1 calculated by the first fuel economy improvement effect calculating means 96 is smaller than the fuel economy improvement amount WFE2 calculated by the second fuel economy improvement effect calculating means 98, it is estimated that the fuel economy of the vehicle 6 can be improved by a larger amount when both of the automatic transmission 18 and the engine 10 are warmed up with the heat exchanging operation of the ATF warmer 140, in the above-described electric-motor-operated warm-up control. In this case, therefore, the warm-up method selecting means 100 selects the warm-up operation of both of the automatic transmission 18 and the engine 10, that is, selects the above-indicated heat-exchanging state of the ATF warmer 140.

An operation of the warm-up implementation determining means 102 corresponds to a step P06 shown in FIG. 6. The warm-up implementation determining means 102 is configured to determine whether the electric-motor-operated warm-up control should be implemented or not. After the first fuel economy improvement effect calculating means 96 and the second fuel economy improvement effect calculating means 98 have respectively calculated the fuel economy improvement amounts WFE1 and WFE2, the warm-up implementation determining means 102 determines whether a larger one of the calculated amounts of improvement of the fuel economy of the vehicle 6 to be obtained in the respective heat-exchanging and non-heat-exchanging states of the ATF warmer 140 is equal to or larger than a predetermined fuel-economy improvement-amount lower limit $LT_{WFE}$. The above-indicated predetermined amount of improvement of the fuel economy of the vehicle 6 to be obtained in the heat-exchanging state of the ATF warmer 140 is the fuel economy improvement amount WFE2 calculated by the second fuel economy improvement effect calculating means 98, while the above-indicated predetermined amount of improvement of the fuel economy of the vehicle 6 to be obtained in the non-heat-exchanging state of the ATF warmer 140 is the fuel economy improvement amount WFE1 calculated by the first fuel economy improvement effect calculating means 96. In other words, the warm-up implementation determining means 102 determines whether a larger one of the fuel economy improvement amount WFE1 calculated by the first fuel economy improvement effect calculating means 96 and the fuel economy improvement amount WFE2 calculated by the second fuel economy improvement effect calculating means 98 is equal to or larger than the above-indicated fuel-economy improvement-amount lower limit $LT_{WFE}$. This lower limit $LT_{WFE}$ is a threshold value predetermined by experimentation so that the above-described electric-motor-operated warm-up control is not implemented where the expected fuel economy improvement effect is not so large. For instance, the lower limit $LT_{WFE}$ is predetermined to be a small value below which the expected fuel economy improvement effect provided by the above-described electric-motor-operated warm-up control is not so large. The warm-up implementation determining means 102 determines that the above-described electric-motor-operated warm-up control should be implemented, if the larger one of the fuel economy improvement amounts is larger than the above-indicated fuel-economy improvement-amount lower limit $LT_{WFE}$.

When the electric-energy storage device 46 is in a cold state, that is, when the battery temperature thbat is equal to or lower than a battery temperature lower limit $LT_{THBAT}$, the warm-up implementation determining means 102 determines that the above-described electric-motor-operated warm-up control should be implemented, irrespective of a result of the above-described determination regarding the fuel economy improvement amounts WFE1 and WFE2. The operation of the electric motor MG to implement the electric-motor-operated warm-up control causes consumption of the electric energy by the electric motor MG and a consequent rise of the battery temperature thbat. The battery temperature lower limit $LT_{THBAT}$ is a threshold value predetermined by experimentation to permit the determination as to whether the temperature of the electric-energy storage device 46 is so cold that it is necessary to raise the battery temperature thbat by operating the electric motor MG to implement the above-described electric-motor-operated warm-up control.

The warm-up control implementing means 104 is configured to implement the above-described electric-motor-operated warm-up control when the control implementing condition determining means 86 has determined that the above-described control implementing conditions have been satisfied, and not to implement the above-described electric-motor-operated warm-up control when the control implementing condition determining means 86 has not determined that the above-described control implementing conditions have been satisfied. However, the warm-up control implementing means 104 implements the above-described electric-motor-operated warm-up control, under the additional condition that the above-described warm-up implementation determining means 102 has determined that the electric-motor-operated warm-up control should be implemented.

Described more specifically, the warm-up control implementing means 104 releases the engine connecting/disconnecting clutch K0, to prevent the engine 10 from loading the electric motor MG, and implements the above-described electric-motor-operated warm-up control for operating the electric motor MG to produce a predetermined warming-up output (the unit of which is kW, for instance). This warming-up output is predetermined by experimentation so as to promote a rise of the working oil temperature tho, while preventing the vehicle operator from feeling uneasy with the warming-up output. The warming-up output may be held constant or may be reduced with a rise of the working oil temperature tho, for example. During implementation of the above-described electric-motor-operated warm-up control in which the hydraulic pump 16 is operated by the electric motor MG, the working oil is supplied from the automatic transmission 18 to the torque converter 14, and is circulated through the ATF warmer 140. The warm-up control implementing means 104 is further configured to release the lock-up clutch 42 during the electric-motor-operated warm-up control, and to inhibit a rotary motion of the turbine impeller 14b of the torque converter 14, for thereby placing the torque converter 14 in a stalling state. For instance, the rotary motion of the turbine impeller 14b can be inhibited by engaging the clutches C and brakes B of the automatic transmission 18 (all of the clutches C1 and C2 and brakes B1, B2 and B3, for example) to place the automatic transmission 18 in an internally locked state in which a rotary motion of the transmission input shaft 70 is prevented. Alternatively, the rotary motion of the turbine impeller 14b can be inhibited by placing the automatic transmission 18 in any one of its gear position while the drive wheels 28 are locked by the wheel braking devices 150 or while the output gear 72 of the automatic transmission 18 is locked by the parking lock device 152.

The warm-up control implementing means 104 is further configured to place the ATF warmer 140 in one of the heat-exchanging and non-heat-exchanging states, during the above-described electric-motor-operated warm-up control, according to the selection of the operating state of the ATF warmer 140 by the warm-up method selecting means 100. If the warm-up method selecting means 100 has selected the above-indicated non-heat-exchanging state of the ATF warmer 140, the warm-up control implementing means 104 holds the electrically operated water pump 142 in its non-operated state to place the ATF warmer 140 in its non-heat-exchanging state during the electric-motor-operated warm-up control. If the warm-up method selecting means 100 has selected the above-indicated heat-exchanging state of the ATF warmer 140, the warm-up control implementing means 104 hold the electrically operated water pump 142 in its operated state to place the ATF warmer 140 in its heat-exchanging state during the electric-motor-operated warm-up control. Thus, the warm-up control implementing means 104 implements the electric-motor-operated warm-up control such that the heat of the working oil of the automatic transmission 18 is transferred to the above-indicated engine cooling water to warm-up the engine 10 with the ATF warmer 140, where the warm-up method selecting means 100 has selected the above-indicated heat-exchanging state of the ATF warmer 140.

In the above-described electric-motor-operated warm-up control, the warm-up control implementing means 104 controls the operating state of the ATF warmer 140 according to the selection by the warm-up method selecting means 100, as described above, such that the ATF warmer 140 is placed in the heat-exchanging state where the improvement amount WFE2 of the fuel economy of the vehicle 6 to be obtained in the heat-exchanging state of the ATF warmer 140, that is, the fuel economy improvement amount WFE2 calculated by the second fuel economy improvement effect calculating means 98 is larger than the improvement amount of the fuel economy of the vehicle 6 to be obtained in the non-heat-exchanging state of the ATF warmer 140, that is, the fuel economy improvement amount WFE1 calculated by the first fuel economy improvement effect calculating means 96. The warm-up control implementing means 104 places the ATF warmer 140 in the operating state selected by the warm-up method selecting means 100, not only upon initiation of the electric-motor-operated warm-up control, but also during the electric-motor-operated warm-up control.

Each time the target temperature reaching determining means 88 has determined that the working oil temperature tho has reached the target value th*, the above-indicated fuel economy improvement amounts WFE1 and WFE2 are calculated, and the warm-up method is selected by the warm-up method selecting means 100. Accordingly, the warm-up control implementing means 104 maintains the selected operating state of the ATF warmer 140 during the electric-motor-operated warm-up control until the above-indicated working oil temperature tho has reached the target value th*. Namely, if the ATF warmer 140 is once placed in its heat-exchanging state, this heat-exchanging state is maintained until the working oil temperature tho has reached the target value th*, and if the ATF warmer 140 is once placed in its non-heat-exchanging state, this non-heat-exchanging state is maintained until the working oil temperature tho has reached the target value th*. It is noted that operations of the target temperature reaching determining means 88 and the warm-up control implementing means 104 correspond to a step P07 shown in FIG. 7.

Figure 9:
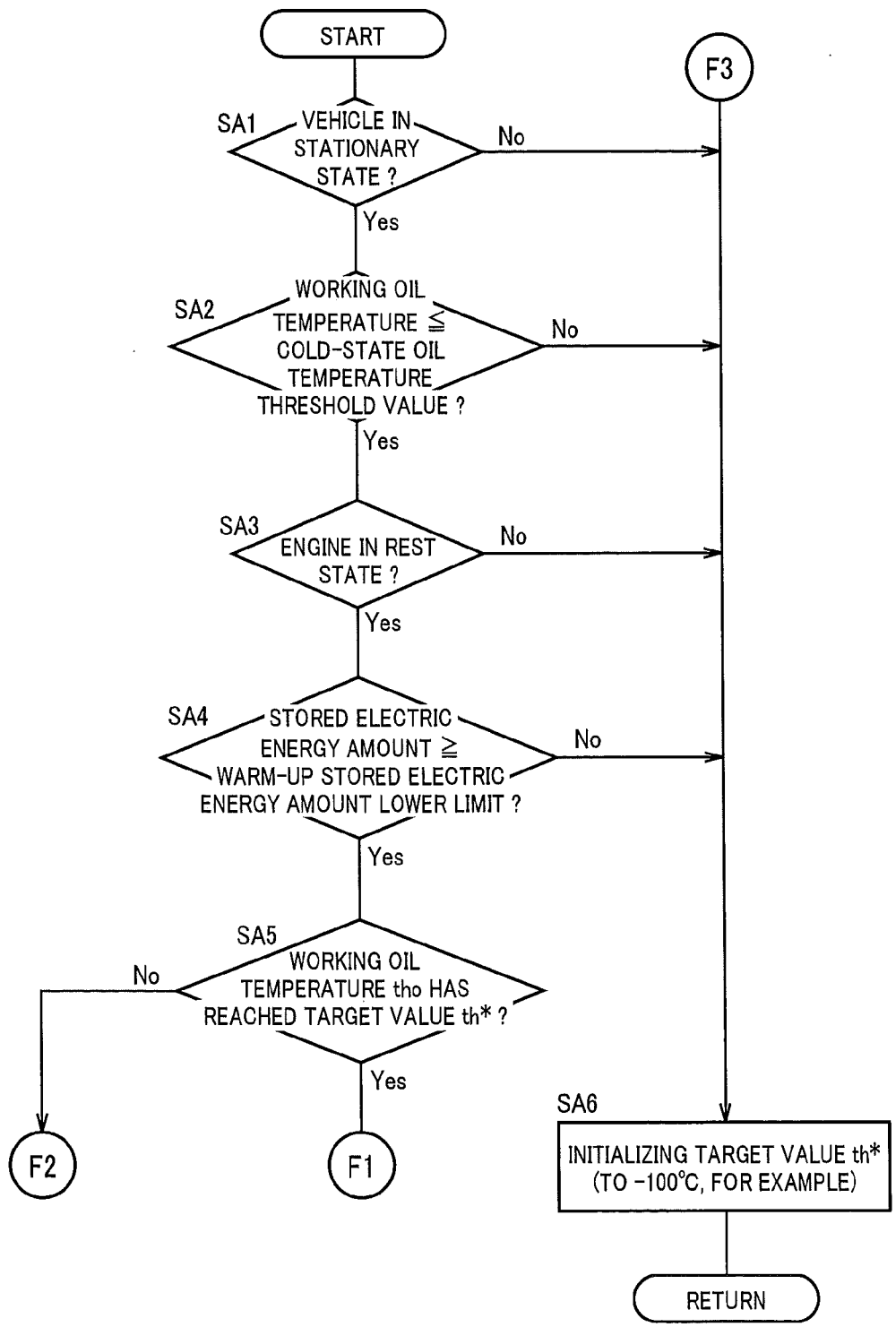
FIG. 9 is a first one of two sheets of a flow chart illustrating a major control operation of the electronic control device of FIG. 4, namely, a control operation to implement the electric-motor-operated warm-up control.
Figure 10:
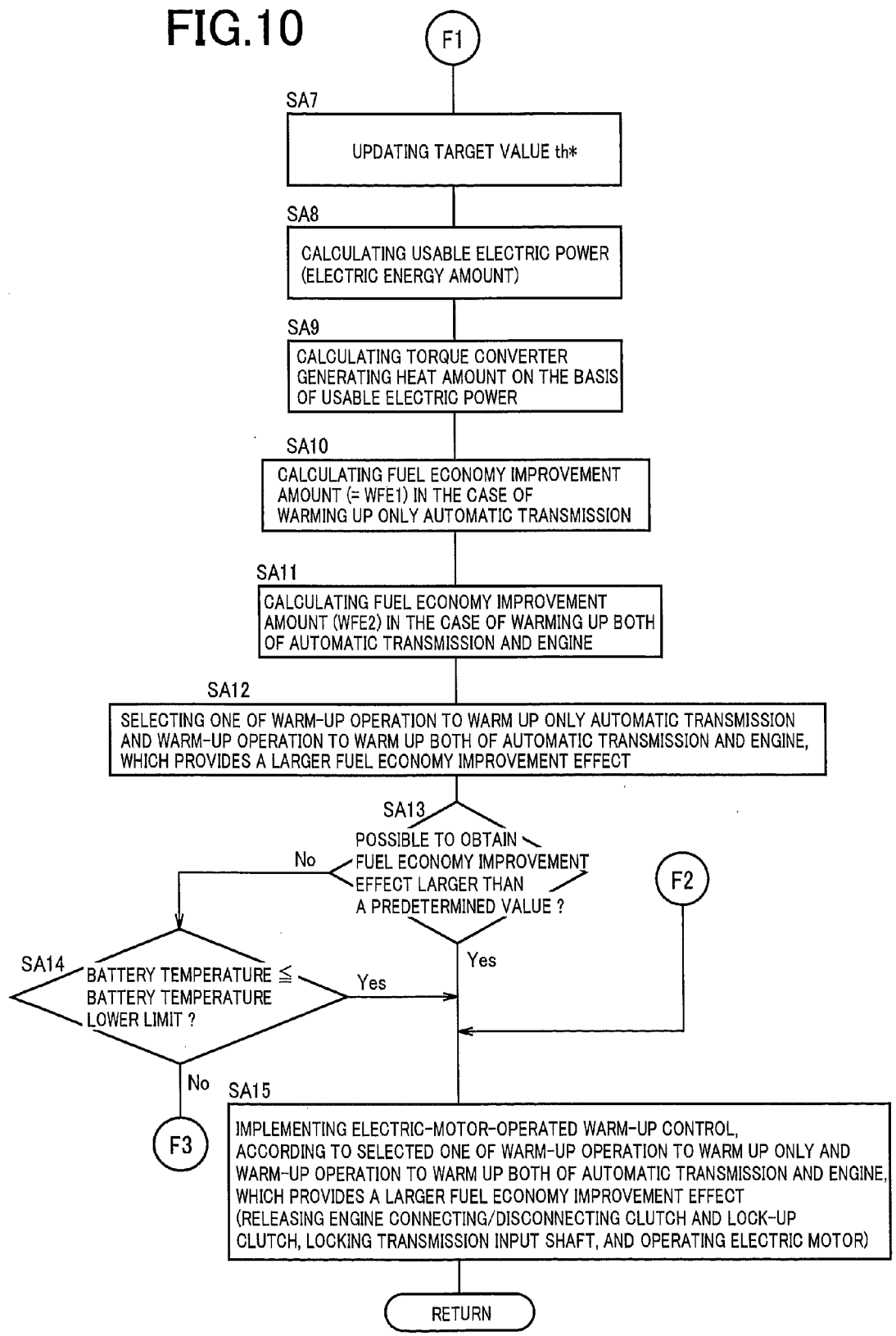
FIG. 10 is a second one of the two sheets of the flow chart illustrating the major control operation of the electronic control device of FIG. 4, namely, the control operation to implement the electric-motor-operated warm-up control.

FIGS. 9 and 10 are a flow chart illustrating a major control operation of the electronic control device 80, namely, a control operation to implement the above-described electric-motor-operated warm-up control. This control operation is repeatedly performed with an extremely short cycle time of about several milliseconds to about several tens of milliseconds.

Initially, a step SA1 (hereinafter "step" being omitted) of FIG. 9 is implemented to determine whether the vehicle 6 is in a stationary state or not. If an affirmative determination is obtained in SA1, that is, if the vehicle 6 is placed in a stationary state, the control flow goes to SA2. If a negative determination is obtained in SA1, on the other hand, the control flow goes to SA6.

SA2 is implemented to determine whether the automatic transmission 18 is so cold that it is necessary to warm-up the automatic transmission 18, more specifically, to determine whether the working oil temperature tho of the automatic transmission 18 is equal to or lower than the above-indicated cold-state threshold value tho1. If an affirmative determination is obtained in SA2, that is, if the above-indicated working oil temperature tho is equal to or lower than the cold-state threshold value tho1, the control flow goes to SA3. If a negative determination is obtained in SA2, on the other hand, the control flow goes to SA6.

SA3 is implemented to determine whether the engine 10 is in a rest state. If an affirmative determination is obtained in SA3, that is, if the engine 10 is in a rest state, the control flow goes to SA4. If a negative determination is obtained in SA3, on the other hand, the control flow goes to SA6.

SA4 is implemented to determine whether the electric energy amount SOC stored in the electric-energy storage device 46 is equal to or larger than the above-indicated warm-up lower limit $SOC1_{LOW}$. If an affirmative determination is obtained in SA4, that is, if the electric energy amount SOC is equal to or larger than the above-indicated warm-up lower limit $SOC1_{LOW}$, the control flow goes to SA5. If a negative determination is obtained in SA4, on the other hand, the control flow goes to SA6. It is noted that SA1-SA4 corresponds to the control implementing condition determining means 86.

SA5 corresponding to the target temperature reaching determining means 88 is implemented to determine whether the working oil temperature tho has reached the target value th*. If an affirmative determination is obtained in SA5, that is, if the working oil temperature tho has reached the target value th*, the control flow goes to SA7 of FIG. 10. If a negative determination is obtained in SA5, the control flow goes to SA15 of FIG. 10.

SA6 is implemented to set the above-indicated target value th* to the initial value.

Referring to FIG. 10, SA7 is implemented to update the target value th* such that the target value th* is increased in steps. When the target value th* is initially updated from the initial value, the target value th* is updated to the above-indicated lock-up initiating temperature value. SA7 is followed by SA8. It is noted that SA6 and SA7 correspond to the target temperature setting means 90.

SA8 corresponding to the usable energy amount calculating means 92 is implemented to calculate the electric power, namely, the electric energy amount usable for the above-described electric-motor-operated warm-up control, on the basis of the surplus stored electric energy amount ($=SOC-SOC1_{LOW}$), which is the difference between the electric energy amount SOC stored in the electric-energy storage device 46 and the warm-up lower limit $SOC1_{LOW}$. SA8 is followed by SA9.

SA9 corresponding to the torque converter generating heat amount calculating means 94 is implemented to calculate the heat amount $Q_{TC}$ of the torque converter 14 on the basis of the above-indicated usable electric energy amount calculated in SA8. This heat amount $Q_{TC}$ of the torque converter 14 is the amount of heat generated for the above-indicated predetermined time period $TIME_{WM}$. SA9 is followed by SA10.

SA10 corresponding to the first fuel economy improvement effect calculating means 96 is implemented to calculate the effect of improvement of the fuel economy by the above-described electric-motor-operated warm-up control to warm up only the automatic transmission 18 without the heat exchanging operation of the ATF warmer 140, more specifically, the fuel economy improvement amount WFE1 to be obtained during the above-indicated predetermined time period $TIME_{WM}$. SA10 is followed by SA11.

SA11 corresponding to the second fuel economy improvement effect calculating means 98 is implemented to calculate the effect of improvement of the fuel economy by the above-described electric-motor-operated warm-up control to warm up both of the automatic transmission 18 and the engine 10 by the heat exchanging operation of the ATF warmer 140, more specifically, the fuel economy improvement amount WFE2 to be obtained during the above-indicated predetermined time period $TIME_{WM}$. SA11 is followed by SA12.

SA12 corresponding to the warm-up method selecting means 100 is implemented to select one of the warm-up operation to warm up only the automatic transmission 18, and the warm-up operation to warm up both of the automatic transmission 18 and the engine 10, which one warm-up operation provides a larger effect of improvement of the fuel economy. Described more specifically, if the fuel economy improvement amount WFE1 calculated in SA10 is equal to or larger than the fuel economy improvement amount WFE2 calculated in SA11, the warm-up operation to warm up only the automatic transmission 18, namely, the non-heat-exchanging state of the ATF warmer 140 is selected. If the fuel economy improvement amount WFE1 is smaller than the fuel economy improvement amount WFE2, on the other hand, the warm-up operation to warm up both of the automatic transmission 18 and the engine 10, namely, the heat-exchanging state of the ATF warmer 140 is selected. SA12 is followed by SA13.

SA13 is implemented to determine whether the above-described electric-motor-operated warm-up control provides a fuel economy improvement effect larger than a predetermined value, more specifically, whether the selected larger one of the fuel economy improvement amount WFE1 calculated in SA10 and the fuel economy improvement amount WFE2 calculated in SA11 is equal to or larger than the above-indicated fuel-economy improvement-amount lower limit $LT_{WFE}$. If an affirmative determination is obtained in SA13, that is, if the selected larger one of the fuel economy improvement amounts WFE1 and WFE2 is equal to or larger than the above-indicated fuel-economy improvement-amount lower limit $LT_{WFE}$, the control flow goes to SA15. If a negative determination is obtained in SA13, on the other hand, the control flow goes to SA14.

SA14 is implemented to determine whether the battery temperature thbat is equal to or lower than the above-indicated battery temperature lower limit $LT_{THBAT}$. If an affirmative determination is obtained in SA14, that is, if the battery temperature thbat is equal to or lower than the battery temperature lower limit $LT_{THBAT}$, the control flow goes to SA15. If a negative determination is obtained in SA14, on the other hand, the control flow goes to SA6 of FIG. 9. It is noted that SA13 and SA14 correspond to the warm-up implementation determining means 102.

SA15 corresponding to the warm-up control implementing means 104 is implemented to continue the above-described electric-motor-operated warm-up control which has been initiated. In the electric-motor-operated warm-up control, the ATF warmer 140 is placed in one of the above-indicated heat-exchanging and non-heat-exchanging states, by placing the electrically operated water pump 142 in the operated or non-operated state, according to the warm-up method selected in SA12. Further, during the electric-motor-operated warm-up control the electric motor MG is operated to provide the above-indicated predetermined warming-up output, and the engine connecting/disconnecting clutch K0 and the lock-up clutch 42 are released, while the turbine impeller 14b of the torque converter 14, that is, the transmission input shaft 70 is locked. It is noted that the control operation illustrated in the flow charts of FIGS. 9 and 10 is repeatedly performed, that is, the control flow goes back to SA1 after SA6 or SA15 is implemented.

The present embodiment is configured such that the warm-up control implementing means 104 implements the above-described electric-motor-operated warm-up control for warming up the automatic transmission 18, wherein the pump impeller 14a of the torque converter 14 is rotated by the electric motor MG to heat the working oil within the torque converter 14, while the torque converter 14 is placed in a staffing state. Accordingly, the working oil within the torque converter 14 is heated during the electric-motor-operated warm-up control, and the heated working oil is working oil for the automatic transmission 18 and supplied to the automatic transmission 18, so that the operation to warm-up the automatic transmission 18 can be promoted. As a result, it is possible to reduce the deterioration of the fuel economy of the vehicle 6.

The present embodiment is further configured such that the warm-up control implementing means 104 places the engine connecting/disconnecting clutch K0 in the released state during the above-described electric-motor-operated warm-up control, so that the electric-motor-operated warm-up control can be implemented while the engine 10 is held at rest. Accordingly, the electric motor MG is not required to be operated to drive the engine 10 during the electric-motor-operated warm-up control, whereby the required output of the electric motor MG can be reduced.

The present embodiment is also configured such that the warm-up control implementing means 104 warms up the engine 10 by transferring a heat of the working oil of the automatic transmission 18 to the above-described engine cooling water, with a heat exchanging operation of the ATF warmer 140, when the warm-up method selecting means 100 has selected said heat-exchanging state of the ATF warmer 140. Accordingly, the operation to warm up the engine 10 as well as the operation to warm up the automatic transmission 18 can be promoted, according to the selection of the heat-exchanging state by the warm-up method selecting means 100, even while the engine is held at rest.

The present embodiment is further configured such that the first fuel economy improvement effect calculating means 96 calculates the fuel economy improvement amount WFE1 for the above-described predetermined time period $TIME_{WM}$, while the second fuel economy improvement effect calculating means 98 calculates the fuel economy improvement amount WFE2 for the above-described predetermined time period $TIME_{WM}$. Namely, the fuel economy improvement amounts WFE1 and WFE2 of the vehicle 6 to be obtained in the respective heat-exchanging and non-heat-exchanging states of the ATF warmer 140 are calculated. The warm-up control implementing means 104 places the ATF warmer 140 in the heat-exchanging state, when the fuel economy improvement amount WFE2 of the vehicle 6 to be obtained in the heat-exchanging state of the ATF warmer 140 is larger than the fuel economy improvement amount WFE1 of the vehicle 6 to be obtained in the non-heat-exchanging state of the ATF warmer 140. Thus, the operation to warm up only the automatic transmission 18 or the operation to warm up both of the automatic transmission 18 and the engine 10 is adequately selected from the standpoint of improving the fuel economy of the vehicle 6, so that the fuel economy improvement effect of the electric-motor-operated warm-up control can be made larger than where both of the automatic transmission 18 and the engine 10 are always warmed up by the above-described electric-motor-operated warm-up control.

The present embodiment is also configured such that the warm-up control implementing means 104 maintains the selected operating state of the ATF warmer 140 until the working oil temperature tho has reached the target value th*. Accordingly, it is possible to avoid frequent switching of the operating state of the ATF warmer 140 between the state in which the heat exchanging operation is performed (heat-exchanging state) and the state in which the heat exchanging operation is not performed (non-heat-exchanging state), that is, frequent switching of the electrically operated water pump 142 between the operated and non-operated states, during the above-described electric-motor-operated warm-up control.

The present embodiment is further configured such that the warm-up implementation determining means 102 determines whether the larger one of the amounts of improvement of the fuel economy of the vehicle 6 to be obtained in the heat-exchanging and non-heat-exchanging states of the ATF warmer 140 is equal to or larger than the predetermined fuel-economy improvement-amount lower limit $LT_{WFE}$, and such that the warm-up control implementing means 104 implements the above-described electric-motor-operated warm-up control if an affirmative determination is obtained by the warm-up implementation determining means 102. Accordingly, the above-described electric-motor-operated warm-up control is not implemented where the expected improvement effect of the fuel economy of the vehicle 6 is not so large, so that the fuel economy of the vehicle 6 can be effectively improved by the above-described electric-motor-operated warm-up control.

While the embodiment of the present invention has been described in detail by reference to the drawings, for illustrative purpose only, it is to be understood that the invention may be embodied various changes and improvements, which may occur to those skilled in the art.

Figure 11:
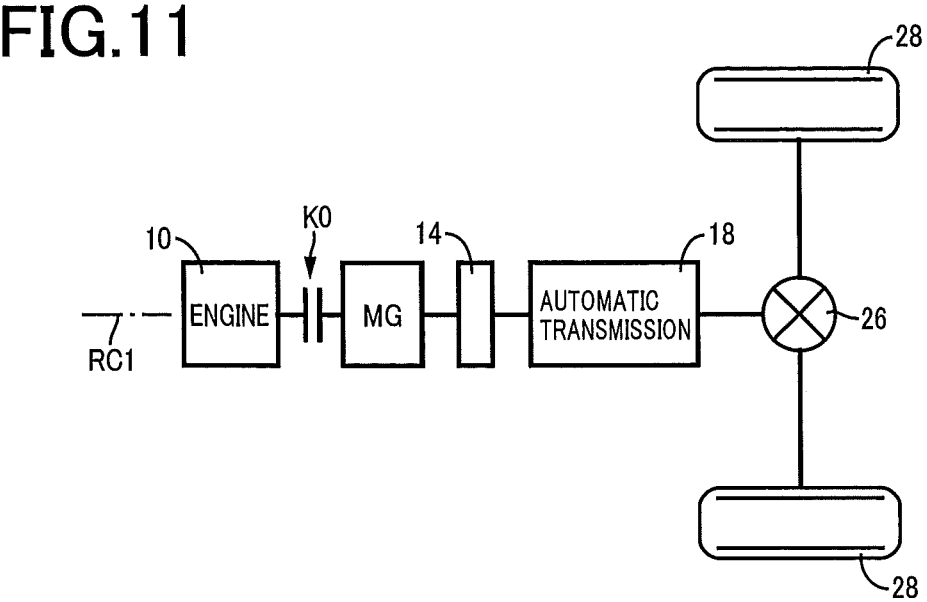
FIG. 11 is a view schematically illustrating a vehicular drive system different in configuration from that of FIG. 1, to which the present invention is suitably application, and in which an engine, a torque converter and an automatic transmission are connected in series coaxially with each other.

In the illustrated embodiment, the electric motor MG has the second axis RC2 radially spaced apart from the axis of the engine 10 (first axis RC1). However, the electric motor MG may be disposed in series and coaxially with the engine 10 on the first axis RC1, as shown in FIG. 11.

In the illustrated embodiment, the first fuel economy improvement effect calculating means 96 calculates the above-described estimated raised working oil temperature $tho_R$ according to the working oil temperature map of FIG. 7. However, the estimated raised working oil temperature $tho_R$ thus calculated may be compensated for heat dissipation from the casing 12, on the basis of the ambient temperature. This is also applicable for calculation of the estimated raised working oil temperature $tho_R$ by the second fuel economy improvement effect calculating means 98.

Although the illustrated embodiment is configured to implement the above-described electric-motor-operated warm-up control under the condition that the engine 10 is held at rest, this condition is not essential, that is, the electric-motor-operated warm-up control may be implemented while the engine 10 is in operation.

While the illustrated embodiment is configured to maintain the once selected operating state of the ATF warmer 140 until the working oil temperature tho has reached the target value th* during the above-described electric-motor-operated warm-up control, the operating states of the electric motor MG, and the engine 10 if operated during the electric-motor-operated warm-up control, as well as the operating state of the ATF warmer 140 may be kept unchanged until the working oil temperature tho has reached the target value th* during the above-described electric-motor-operated warm-up control.

In the illustrated embodiment, SA5 of the flow chart of FIG. 9 is implemented to determine whether the working oil temperature tho has reached the target value th*. When the ATF warmer 140 is placed in the heat-exchanging state, the above-indicated determination may be replaced by a determination as to whether the engine water temperature thw rather than the working oil temperature tho has reached the target value th*. In this determination regarding the engine water temperature thw, the above-described target value th* is used as the target value of the engine water temperature thw.

In the illustrated embodiment of FIG. 2, the ATF warmer 140 is provided integrally with the automatic transmission 18. However, this ATF warmer 140 may be replaced by an oil cooler which is provided separately from the automatic transmission 18 and which has the same function as the ATF warmer 140.

Although the control implementing condition determining means 86 in the illustrated embodiment determines whether the above-described control implementing conditions (i)-(iv) have been satisfied, these conditions are given by way of example, only, and some of the conditions may be eliminated, or replaced by any other condition or conditions.

While the drive system 8 in the illustrated embodiment is provided with the engine 10, the drive system 8 may be replaced by a drive system for an electric vehicle not provided with the engine 10. In this drive system not provided with the engine 10, the provision of the ATF warmer 140 or any other device for raising the engine water temperature thw is not necessary, and the control operation illustrated in the flow charts of FIGS. 9 and 10 need not be formulated to warm up the engine 10 in addition to the automatic transmission 18.

Although SA13 and SA14 are provided in the control operation illustrated in the flow charts of FIGS. 9 and 10 in the illustrated embodiment, these steps SA13 and SA14 may be eliminated, so that SA12 is followed by SA15.

In the above-described electric-motor-operated warm-up control implemented in SA15 of the flow charts of FIGS. 9 and 10 in the illustrated embodiment, the electrically operated water pump 142 is operated according to the selection made in SA12. However, the selection in SA12 is not essential, and the electrically operated water pump 142 may be kept in the operated state or in the non-operated state during the electric-motor-operated warm-up control.

In the above-described electric-motor-operated warm-up control implemented according to the flow charts of FIGS. 9 and 10 in the illustrated embodiment, a larger one of the fuel economy improvement effects to be obtained by the warm-up operation to warm up only the automatic transmission 18 and both of the automatic transmission 18 and the engine 10 is selected in SA12 each time the determination that the working oil temperature tho has reached the target value th* is obtained in SA5. However, the selection in SA12 may be made upon initiation of the above-described electric-motor-operated warm-up control. In this case, the selection in SA12 is not made during implementation of the electric-motor-operated warm-up control.

Although the drive system 8 according to the illustrated embodiment is installed transversely on the FF type vehicle 6, the vehicle 6 on which the drive system 8 is installed may be of an FR type, and the drive system 8 may be installed longitudinally on the vehicle 6.

In the illustrated embodiment, the electric motor MG is connected to the pump impeller 14a of the torque converter 14 through a pair of gears in the form of the electric motor output gear 56 and the electric motor connecting gear 58. However, the electric motor MG may be connected to the pump impeller 14a through a transmission belt or a chain through which the electric motor MG.

While the lock-up clutch 42 is provided in the illustrated embodiment, the provision of the lock-up clutch 42 is not essential.

In the drive system 8 according to the illustrated embodiment, the torque converter 14 is provided as the fluid-operated power transmitting device. However, the torque converter 14 may be replaced by a fluid coupling or any other fluid-operated coupling device which does not have a torque boosting function.

Although the automatic transmission 18 in the illustrated embodiment is a step-variable automatic transmission, the automatic transmission 18 may be replaced by a CVT the speed ratio γ of which is continuously variable, or a manually operated transmission.

While the hydraulic pump 16 in the illustrated embodiment is the mechanically operated pump driven by the electric motor MG, the hydraulic pump 16 may be replaced by an electrically operated pump. However, the electrically operated pump must be operated during the above-described electric-motor-operated warm-up control, since the working oil should be supplied to the torque converter 14 during the electric-motor-operated warm-up control.

NOMENCLATURE OF REFERENCE SIGNS

6: Vehicle
8: Drive system (Vehicular drive system)
10: Engine
14: Torque converter (Fluid-operated power transmitting device)
14a: Pump impeller (Input rotary element)
14b: Turbine impeller (Output rotary element)
18: Automatic transmission
28: Drive wheels
80: Electronic control device (control apparatus)
140: ATF warmer (Heat exchanging device)
MG: Electric motor
K0: Engine connecting/disconnecting clutch

The invention claimed is:

1. A control apparatus for a vehicular drive system provided with an automatic transmission constituting a part of a power transmitting path between an electric motor and drive wheels, and a fluid-operated power transmitting device provided between the electric motor and the automatic transmission and having a pump impeller connected to said electric motor, and an output rotary element connected to said automatic transmission, an engine, and an engine connecting/disconnecting clutch interposed between said engine and said pump impeller and configured to selectively connect said engine and said pump impeller to each other, and a heat exchanging device configured to be operable to carry out a heat exchange between a cooling water of said engine and a working oil of said fluid-operated power transmitting device, said control apparatus comprising:
an electronic control device configured to:
implement a stall control of said fluid-operated power transmitting device wherein the pump impeller of said fluid-operated power transmitting device is rotated by said electric motor while the fluid-operated power transmitting device is placed in a stalling state, such that said stall control of said fluid-operated power transmitting device is implemented with said engine being in a rest state;
place said engine connecting/disconnecting clutch in a released state and disconnect said engine from said pump impeller during said stall control of the fluid-operated power transmitting device that is implemented with said engine being in the rest state; and
warm up said engine by transferring a heat of said working oil to said cooling water, with a heat exchanging operation of said heat exchanging device during said stall control of the fluid-operated power transmitting device that is implemented with said engine being in the rest state.

2. The control apparatus according to claim 1, wherein said control device is configured to calculate amounts of improvement of fuel economy of a vehicle to be respectively obtained in a heat-exchanging state and a non-heat-exchanging state of said heat exchanging device during said stall control of the fluid-operated power transmitting device, and wherein said control device is configured to place said heat exchanging device in said heat-exchanging state for performing the heat exchanging operation during said stall control of the fluid-operated power transmitting device, when the calculated amount of improvement of the fuel economy of the vehicle to be obtained in the heat-exchanging state of said heat exchanging device is larger than the calculated amount of improvement of the fuel economy of the vehicle in the non-heat-exchanging state of said heat exchanging device.

3. The control apparatus according to claim 2, wherein said control device is configured to maintain one of said heat-exchanging and non-heat-exchanging states of said heat exchanging device which has been once selected until a temperature of said working oil has reached a target value during said stall control of the fluid-operated power transmitting device.

4. The control apparatus according to claim 2, wherein said control device is configured to implement said stall control of the fluid-operated power transmitting device when a larger one of the amounts of improvement of the fuel economy of said vehicle to be respectively obtained in said heat-exchanging state and said non-heat-exchanging state of said heat exchanging device is equal to or larger than a predetermined fuel-economy improvement-amount lower limit.

5. The control apparatus according to claim 1,
wherein the electric motor is to be driven by an electric energy supplied from an electric-energy storage device, and
wherein said control device is configured to implement said stall control of the fluid-operated power transmitting device when an amount of the electric energy stored in the electric-energy storage device is not smaller than a predetermined lower limit.

* * * * *